(12) United States Patent
Higgins et al.

(10) Patent No.: US 9,100,728 B2
(45) Date of Patent: Aug. 4, 2015

(54) SERVER MONITORING OF FLOW AND SAMPLING APPARATUS AND/OR LOGGER

(75) Inventors: Timothy Alan Higgins, Fort Collins, CO (US); Samuel Wallace Kent Miller, IV, Fort Collins, CO (US)

(73) Assignee: Hach Company, Leveland, CO (US)

( * ) Notice: Subject to any disclaimer, the term of this patent is extended or adjusted under 35 U.S.C. 154(b) by 1042 days.

(21) Appl. No.: 13/154,545

(22) Filed: Jun. 7, 2011

(65) Prior Publication Data
US 2011/0304475 A1 Dec. 15, 2011

Related U.S. Application Data

(60) Provisional application No. 61/397,363, filed on Jun. 10, 2010.

(51) Int. Cl.
*H04Q 9/00* (2006.01)
*H04Q 9/02* (2006.01)

(52) U.S. Cl.
CPC ............ *H04Q 9/00* (2013.01); *C02F 2209/005* (2013.01); *C02F 2209/008* (2013.01); *H04Q 2209/43* (2013.01); *H04Q 2209/86* (2013.01)

(58) Field of Classification Search
None
See application file for complete search history.

(56) References Cited

U.S. PATENT DOCUMENTS

| | | |
|---|---|---|
| 3,824,550 A | 7/1974 | Schoenwitz |
| 4,650,562 A | 3/1987 | Harman, III et al. |
| 5,315,880 A | 5/1994 | Bailey |
| 5,487,314 A | 1/1996 | Phillips |
| 5,506,791 A | 4/1996 | Hungerford et al. |
| 5,544,531 A | 8/1996 | Heckman |
| 5,633,809 A | 5/1997 | Wissenbach et al. |
| 5,644,088 A | 7/1997 | Heckman |
| 5,691,914 A | 11/1997 | Randolph |
| 5,811,688 A | 9/1998 | Marsh et al. |
| 6,208,943 B1 | 3/2001 | Randolph et al. |
| 6,307,469 B1* | 10/2001 | Mandry ........................ 340/533 |
| 2006/0031040 A1 | 2/2006 | Wolfe |
| 2007/0163965 A1* | 7/2007 | Wolfe ............................ 210/739 |
| 2010/0265073 A1* | 10/2010 | Harper ........................ 340/573.1 |

FOREIGN PATENT DOCUMENTS

| | | |
|---|---|---|
| KR | 10-2003-0045420 | 6/2003 |
| KR | 10-2003-0066073 | 8/2003 |
| KR | 10-2006-0087797 | 8/2006 |

OTHER PUBLICATIONS

International Search Report and Written Opinion mailed Feb. 15, 2012, received in PCT Application No. PCT/IB2011/052481.

\* cited by examiner

*Primary Examiner* — Daniell L Negron
*Assistant Examiner* — John Bamert
(74) *Attorney, Agent, or Firm* — Ference & Associates LLC

(57) ABSTRACT

Described is an apparatus and method employing one or more environmental instruments in communication with a communication server that monitors the operation of the environmental instruments based on a task schedule.

18 Claims, 8 Drawing Sheets

| SAMPLER/LOGGER | PRIMARY INTERVAL | CALL | LAST CALL MADE YES/NO | ALARM | ALARM TRIGGER | CALLS MISSED |
|---|---|---|---|---|---|---|
| A - LOGGER 1 | 9.0 HRS | ✓ | YES | NO | 1 | 0 |
| B - LOGGER 2 | 1.0 HRS | ✓ | YES | NO | 3 | 0 |
| C - SAMPLER 1 | 30 MIN | ✗ | NO | NO | 4 | 1 |
| D - LOGGER 3 | 12 HRS | ✓ | NO | YES | 1 | 1 |
| E - SAMPLER 2 | 15 MIN | ✓ | YES | NO | 4 | 0 |
| F - SAMPLER 3 | 10 SEC | ✗ | NO | YES | 3 | 15 |

FIG. 8

SERVER MONITORING OF FLOW AND SAMPLING APPARATUS AND/OR LOGGER

CROSS-REFERENCE TO RELATED APPLICATIONS

This application claims priority of U.S. Provisional Application No. 61/397,363, entitled "Server Monitoring of Flow and Sampling Apparatus and/or Logger" filed Jun. 10, 2010, the entire contents and disclosure of which are incorporated herein by reference.

FIELD OF THE INVENTION

The present invention relates to an apparatus and method for remotely monitoring water quality.

BACKGROUND

Systems for monitoring the characteristics of water sources are critical to many industries. For example, such monitoring is required for many regulatory agencies such as the EPA and FDA. Often, water sources that are of interest are located in remote locations that are difficult to access by humans. Therefore, water monitoring is done by means of automated collection of samples by a sampler device. Automated remote sampling of water sources allows for sampling of water sources at varying times and locations. Traditionally, the remotely located samplers are delivered to their installed sites with a predetermined schedule for monitoring. For example, in one such water quality monitoring system a sampler may be installed at a remote Mississippi tributary with a preset sampling schedule of one sample every 12 hours. But there are several drawbacks to systems of this type. For example, one drawback is that the preset sampling schedule may need to be modified. Also, accessing the remote site may be difficult and expensive. In addition, the person performing the installation is often a contractor to the environmental engineer and, therefore, does not have the authority to make on-site modifications to the sampling parameters of the monitoring system.

SUMMARY

According to a first broad aspect of the present invention, there is provided an apparatus comprising: one or more environmental instruments for monitoring water quality for one or more water streams, a communication server comprising a server monitor, an alarm transmission server in communication with the communication server, and a server database, wherein the communication server is in communication with the one or more environmental instruments, wherein each of the one or more environmental instruments connects to the communication server to report on tasks run by the environmental instrument based on a primary interval for the environmental instrument, wherein the server monitor continuously queries the server database for tasks that are scheduled to be run by each of the one or more environmental instruments based on a task schedule and a current time on the communication server, wherein the task schedule is based on the primary intervals for each of the one or more environmental instruments, and wherein an alarm transmission server of the one or more servers sends an alarm to one or more output devices if the server monitor determines that a selected environmental instrument of the one or more environmental instruments is malfunctioning based on the selected environmental instrument failing to connect to the communication server for one or more primary intervals for the environmental instrument.

According to a second broad aspect of the present invention, there is provided a method comprising the following steps: (a) a server monitor of a communication server continuously querying a server database for tasks that are scheduled to be run by each of one or more environmental instruments based on a task schedule and a current time, (b) an alarm transmission server for sending an alarm to one or more output devices if the server monitor determines that a selected environmental instrument of the one or more environmental instruments is malfunctioning based on the selected environmental instrument failing to connect to the communication server for one or more primary intervals for the environmental instrument, wherein the alarm transmission server is in communication with the communication server, wherein the one or more environmental instruments monitor water quality for one or more water streams, and wherein the task schedule is based on the primary intervals for each of the one or more environmental instruments.

BRIEF DESCRIPTION OF THE DRAWINGS

The accompanying drawings illustrate exemplary embodiments of the invention and, together with the general description given above and the detailed description given below, serve to explain the features of the invention. The figures are not necessarily to scale, and some features may be exaggerated to show details of particular components. Therefore, specific details disclosed herein are not to be interpreted as limiting, but merely as a basis for the claims and as a representative basis for teaching one skilled in the art to variously employ the present invention. As a result, the invention is not limited to the specific examples described below, but only by the claims and their equivalents.

FIG. 8 is an example of a call schedule for a sever monitor displayed on a visual display device according to one embodiment of the present invention.

DETAILED DESCRIPTION

Definitions

Figure 1:
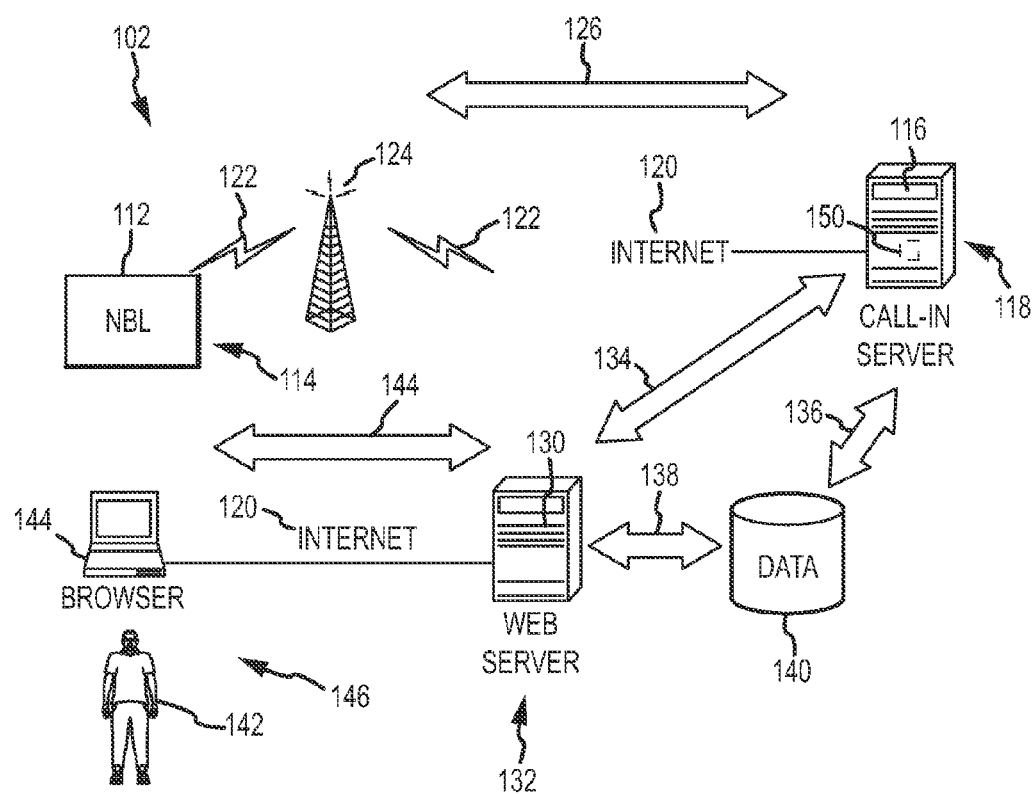
FIG. 1 is a schematic diagram that illustrates a water quality monitoring apparatus according to one embodiment of the present invention.

Where the definition of a term departs from the commonly used meaning of the term, applicant intends to utilize the definition provided below, unless specifically indicated.

For purposes of the present invention, it should be noted that the singular forms "a," "an," and "the" include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc. are used merely for convenience in describing the various embodiments of the present invention. The embodiments of the present invention may be oriented in various ways. For example, the diagrams, apparatuses, etc. shown in the drawing figures may be flipped over, rotated by 90° in any direction, reversed, etc. For example, rows and/or columns may be oriented in any direction.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "alarm transmission server" refers to a server that sends an alarm to one or more output devices or displays an alarm on a browser based on an environmental instrument failing to connect to a communication server for one or more primary intervals. An example of an alarm transmission server is a web server.

For purposes of the present invention, the term "analysis report" refers to any organized presentation of data, raw data or historical data, manipulated data, observational data, information, analysis result, etc., based on data obtained or collected from one or more sensors and that is generated or manipulated by an analyzer on an environmental instrument and/or server. An analysis report may be prepared for any intended recipient, such as an elected official, manager or operator of a water treatment system, customer, member of the public, etc. According to some embodiments of the present invention, an "analysis report" may be a submission to a regulatory and/or law enforcement agency in any required format.

For purposes of the present invention, the term "analysis result" refers to any information, value, relationship, product, etc., created by aggregation, calculation, algorithm, analysis, manipulation, etc., of data or information obtained or collected from one or more sensors as performed by an analyzer on the environmental instrument and/or the server of the present remote water quality monitoring system. For example, an "analysis result" may include observational data analyzed, manipulated, etc., by an environmental instrument.

For purposes of the present invention, the term "analyzer" refers to a portion of an environmental instrument, such as a sampler or logger, or a portion of a server in which may be stored one or more software program(s) or other routine(s), firmware and/or hardware, which may analyze, manipulate, etc., data such as raw data, observational data, historical data or any other information obtained from one or more environmental instruments. According to some embodiments of the present invention, an analyzer may analyze or manipulate the data to generate the output. The analyzer may comprise a source code or a software program. According to some embodiments of the present invention, the analyzer may compare the data continuously, in real-time, at periodic or selected intervals, on condition or on demand by a user. According to some embodiments of the present invention, the output may comprise one or more of the following: data, alarm, analysis result or analysis report.

For purposes of the present invention, the term "call interval" refers to the frequency at which an environmental instrument initiates a connection to the communication server, i.e., communicates with the communication server, at which point the server transfers data to/from the environmental instrument.

For purposes of the present invention, the term "call interval modifying module" refers to hardware and/or software that allow a user and/or an environmental instrument to change the call interval for the environmental instrument based on collected environmental data. A call interval modifying module may be stored in an environmental instrument and/or a server. A call interval modifying module may be part of an environmental instrument, a server, a web-enabled application, etc.

For purposes of the present invention, the term "communication server" refers to a server in communication with one or more environmental instruments. A communication server receives data from the one or more environmental instruments. A communications server also sends data and/or instructions to the one or more environmental instruments.

For purposes of the present invention, the term "data" refers to any information, reading, measurement, value, etc., ultimately obtained from one or more sensors or derived from such data. The term "data" includes any data or information, including raw data obtained directly from one or more sensors without manipulation, historical data earlier obtained from one or more sensors or entered or derived from data obtained at an earlier point or period in time, and analyzed or manipulated data, such as data or information manipulated, analyzed, etc., by an analyzer. The term "data" may include, for example, an analysis result or observational data.

For purposes of the present invention, the term "database" refers to a device or apparatus of the present remote water quality monitoring system used to store data, raw data, historical data, manipulated data and/or information in a logical or ordered arrangement or configuration. The database may be either part of the server or separate from the server, albeit connected to or in communication with the server.

For purposes of the present invention, the term "database maintenance," the term "server maintenance" and the term "database/server maintenance" refer to a server/server monitor archiving and removing old data from a database, deleting files from a local drive that are no longer needed and performing other functions relating to databases and data storage.

For purposes of the present invention, the term "database publishing" refers to a server/server monitor publishing data at another location where the data is accessible to third parties.

For purposes of the present invention, the term "distant" in reference to a server and/or server database refers to the server and/or server database being physically separated from an environmental instrument or remote user. The term "distant" may refer to a server and/or server database that is connected with or linked to one or more environmental instruments and one or more remote users only via a wireless communication system.

For purposes of the present invention, the term "electronic control system" refers to a portion of a water treatment system that may control the operation of equipment and operation of a water treatment system. According to some embodiments of the present invention, a server of the present invention may access or collect data from one or more sensors via an electronic control system. An electronic control system may include an in-house supervisory control and data acquisition system (SCADA) or a programmable logic controller (PLC).

For purposes of the present invention, the term "environmental data" refers to data obtained by a sensor that relates to the environment or changes to the environment of a location at which a sensor is located.

For purposes of the present invention, the term "environmental instrument" refers to a sampler, a logger, or a sensor or any other device that is used in the process of monitoring water.

For purposes of the present invention, the term "hardware and/or software" refers to functions that may be performed by digital software, digital hardware or a combination of both digital hardware and digital software. For example, a "program" may be a software program, a program that is part of the digital hardware of a computer or environmental instrument, or a combination of both digital hardware and digital software.

For purposes of the present invention, the term "host server" refers to a server hosting a server monitor.

For purposes of the present invention, the term "interactive visual display device" refers to a visual display device that a user may interact with by means of an input device. The input device may be a touchscreen of the visual display device, a touchpad, a mouse, a trackball, a keyboard, etc. Examples of interactive visual display devices include a computer with a monitor, a laptop computer, a tablet computer, a cell phone, a smartphone, etc.

For purposes of the present invention, the term "instructions" refers to the command(s) given by a computer/processor to carry out particular operation(s), i.e., the conventional meaning of the term "instructions" with respect to digital technology.

For purposes of the present invention, the term "instructions module" refers to hardware and/or software in one or more servers that creates the instructions to be sent to the one or more environmental instruments.

For purposes of the present invention, the term "logger" or "data logger" refers to a device that records data. An example of a logger is a water flow logger that records the water flow of a water source.

For purposes of the present invention, the term "missed call task" refers to a task in which the server monitor monitors one or more environmental instruments in communication with a server and determines that an instrument has missed its scheduled connection to the server if the environmental instrument does not communicate with the sever within the primary call interval for the instrument. In one embodiment of the present invention, an adjustable "alarm trigger value" for each environmental instrument may be stored in a server database. The alarm trigger value specifies the number of consecutive missed connections that must occur before the missed call alarm is "set" for that environmental instrument. The missed call alarm will remain "set" until the instrument makes a successful connection to the server. At that time the alarm will be "cleared". Each time that the missed call alarm state changes, information is stored in the server database so that historical records of missed call alarms for every instrument are maintained. The current "set" or "cleared" state for each environmental instrument can be retrieved from the database at any time. This instrument status for the environmental instrument may be displayed in reports and dashboard/status screens accessible through the web site.

For purposes of the present invention, the term "mode of communication" and the term "communication link" refer to any suitable technology or device known and available in the art for communicating between two or more devices. A mode of communication may be achieved or carried out through any suitable medium, such as any wired or wireless connections as well as any protocols, including, but not limited to: the Internet; GMR (Geo-Mobile Radio); TCP/IP; MODBUS RTU, MODBUS ASCII, and MODBUS TCP; XML; Ethernet; file transfer protocol (FTP); Bluetooth®; ZigBee®; e-mail, such as SMTP; cellular modems; cellular phone networks, such as CDMA and TDMA; radio signals or remote terminal units (RTU) coupled to radio frequency transmitters; satellite transmission; SDI-12; existing telephone or communication networks or wiring; a standard Public Switched Telephone Network (PSTN); dial-up using landline or telephone; a wireless network such as Wi-Fi; a wide area network (WAN); a wireless local area network (WLAN); a local area network (LAN) or a metropolitan area network (MAN); a cable Internet connection; short message system (SMS); dial-up modem; a point-to-point link; global system for mobile communications (GSM, 3GSM), general packet radio services (GPRS), evolution-data optimized (EV-DO), enhanced data rates for GSM evolution (EDGE), digital enhanced cordless telecommunications (DECT), integrated digital enhanced network (iDEN), universal mobile telecommunications systems (UMTS) or advanced mobile phone systems (AMPS); or any other means for communicating between two or more devices known to those skilled in the art. The exact mode of communication may vary depending on the circumstances. According to some embodiments of the present invention, a communication link may be used to transmit and/or receive communications between two or more devices continuously, in real-time, at periodic or selected intervals, on condition or on demand by a user or by one or more of the two or more devices.

For purposes of the present invention, the term "observational data" refers to data or information that has been analyzed, manipulated, etc., by the environmental instrument, such as by an analyzer on the environmental instrument, from raw data or information obtained from one or more sensors prior to being transmitted to a server and/or server database.

For purposes of the present invention, the term "output" refers to any product, publication, submission, uploaded content, etc., including any information, data, analysis result, analysis report, etc., that may be communicated from the server of the present remote water quality monitoring system to a remote viewing device in a format suitable for display by the remote viewing device to a user.

For purposes of the present invention, the term "output device" refers to any device or apparatus known in the art that may be used by a user to view or that makes a user aware of an output of the water quality monitoring system, such as, for example, personal computers or terminals, servers, etc., as well as a variety of handheld personal communications equipment, such as cell phones, pagers, PDAs, BlackBerrys®, Palm® devices, iPhones®, etc.

For purposes of the present invention, the term "processor" refers to a single processing device or a group of inter-operational processing devices. Some examples of processors are computers, integrated circuits, logic circuitry, etc.

For purposes of the present invention, the term "remotely located" and the term "remote" refer to instruments being physically isolated except for direct collaboration with each other or indirect interaction through a website such as FSDATA™.

For purposes of the present invention, the term "remote user" refers to a user that is remotely located from one or more environmental instruments of a water quality monitoring system according to an embodiment of the present invention.

For purposes of the present invention, the term "remote water quality monitoring system" refers to a system for remotely monitoring the operation and equipment of a remotely located water treatment system or the water quality in, toward or from a remotely located water treatment system using sensors to collect data that is transmitted to a server for analysis, manipulation and communication to a remote viewing device for a user.

For purposes of the present invention, the term "sampler" refers to a device that draws predefined liquid volumes based on a set of rules. The set of rules may be preset for the sampler or defined in a sample program for the sampler by a user. Examples of samplers include Hach sd900™, American Sigma 900Max™, etc.

For purposes of the present invention, the term "sensor" and the term "water quality sensor" refer to a device, probe or apparatus for the detection or measurement of parameters or values relevant to water quality, such as values for water flow including water level, flow velocity, etc. The term "sensor" may refer to a device, probe or apparatus connected to an environmental instrument, such as a logger.

For purposes of the present invention, the term "server" refers to one or more computers with which environmental instruments and remote visual display devices communicate. The server computer may collect, assemble, aggregate, manipulate or analyze data from one or more sensors of the present remote water quality monitoring system prior to the data being transmitted to the server of the present remote water quality monitoring system. The "server" may be any computer able to (1) at least temporarily store, collect, assemble, aggregate, etc., data from one or more sensors and (2) transmit data or information to a server (or a server database associated with the server) via a mode of communication. Thus, a "server" may contain or include (1) one or more memory device(s) to store, collect, assemble, aggregate, etc., the data at least temporarily, (2) one or more ports or inputs for receiving data or information either directly or indirectly from one or more sensors, and (3) one or more transmission interface(s) to transmit data or information to a server. Also, a "server" may have the ability to process, manipulate, analyze, etc., the data obtained from the one or more sensors, such as by an analyzer or software located on the environmental instrument, prior to transmission of data or information to the server and/or server database. A "server" may be a web or Internet server. The "server" may further include a database and/or an analyzer.

For purposes of the present invention, the term "server database" refers to a device or apparatus of the present remote water quality monitoring system used to store data, raw data, historical data, manipulated data and/or information, such as in a logical or ordered arrangement or configuration. The server database may be part of the server or separate, albeit connected to or in communication with the server. As such, the "server database" is physically separated, i.e., at a remote or distant location, from the location of the environmental instruments and the remote users of a remote water quality monitoring system.

For purposes of the present invention, the term "set of environmental instruments" refers to the environmental instrument(s) at a particular location. A set of environmental instruments may comprise a single sampler, logger or sensor or may comprise a combination of one or more samplers, one or more loggers and/or one or more sensors.

For the purposes of the present invention, the term "server status notification" refers to a server monitor/server sending e-mail, SMS messages, or any other type of communication to a visual display device or other type of output device with server performance statistics, either on a schedule or when there are potential problems with the server. Examples of server performance statistics include but are not limited to: communication bandwidth, the current time on the server, etc.

For purposes of the present invention, the term "server monitor" refers to hardware and/or software on a server that performs scheduled tasks. A server monitor may be extensible so that new tasks can be designed and "plugged-in" at a later time. Information that identifies the task and the schedule for a task may be stored in a server database. The server monitor runs in a never-ending loop where it queries the server database for a single task that is scheduled to run based on the task schedule and the current time on the server. After a task is executed, the current time and results of the task are saved to the server database so that historical records are maintained. One example of a task that may be performed by a server monitor is to monitor for missed calls. Other examples of tasks are to provide server status notifications, provide database/server maintenance, perform database publishing, etc.

For purposes of the present invention, the term "task" refers to tasks performed by an environmental instrument or a server/server monitor. One example of a task may be for an environmental instrument to call a communication server at a regular interval, i.e., a primary interval, with the results of measurements of water quality taken by an environmental instrument. The server/server monitor may have the corresponding task "checking for missed calls," i.e., of determining if the environmental instrument has connect to the communication server at each primary interval. Another example of an task performed by a server may be to delete all data determined to be older than two (2) months by an environmental instrument performing the task "check age of data." Another example of a task performed by a server may be to send an e-mail and/or text message to an operator/user if an environmental instrument performing the task of determining if a water source has a chlorine level in excess of 100 ppm determines that the chlorine level is greater than 100 ppm.

For purposes of the present invention, the term "task instructions" refers to instructions sent to an environmental instrument that cause the environmental instrument to perform one or more tasks and to instructions performed by an environmental instrument.

For purposes of the present invention, the term "task schedule" refers to a time schedule that determines when tasks are performed by a server monitor and/or when a task is performed by a server.

For purposes of the present invention, the term "transmission interface" refers to a portion of an environmental instrument, electronic control system and/or one or more sensors of a remote water quality monitoring system that is capable of transmitting data or information to a server via any suitable wireless mode of communication.

For purposes of the present invention, the terms "treat," "treated," "treating," "treatment," and the like shall refer to any process, treatment, generation, production, discharge or other operation that may be performed by a water treatment system on, or in relation to, the water in the water treatment system.

For purposes of the present invention, the term "user" refers to a person, entity or agency that views data, information, analysis results or analysis reports communicated from the server to the remote viewing device of the present remote water quality monitoring system.

For purposes of the present invention, the terms "visual display device" and "visual display apparatus" include any type of visual display device or apparatus such as a CRT monitor, LCD screen, LEDs, projected display, printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head-mounted display, heads-up display (HUD), global positioning system (GPS) receiver, automotive navigation system, dashboard, watch, microwave oven, automated teller machine (ATM), etc. A visual display device is one type of output device.

For purposes of the present invention, the term "water" refers to any type of water found in nature, contaminated or uncontaminated by pollutants, and water or any fluid that may be processed, treated, generated, produced, discharged, etc., by a water treatment system. For example, the term "water" may refer to wastewater collected by a wastewater collection system or to water being treated or processed by a water treatment facility for the distribution of potable drinking water to the public, or the term "water" may refer to effluent from an industrial plant, or sewage or wastewater processed or treated by a central wastewater treatment plant (WWTP). Thus, "water" may include any number of pollutants, solutes, sediments, suspensions, organic matter, etc., as the case may be.

For purposes of the present invention, the term "water flow logger" refers to a logger that records water flow of a water source. A water flow logger may be used to determine the rate of flow, level or velocity in a natural water flow such as a creek, stream, river, etc., or water flow in a man-made conduit such as a canal, pipe, weir, flume, sewer, etc.

For purposes of the present invention, the term "water quality" refers to any characteristic of water, including such characteristics as flow, velocity, level, conductivity, potability, turbidity, pH, dissolved solids, concentration of various impurities, concentration of various metals, concentrations of various ions, etc., for a water source or a water stream.

For the purposes of the present invention, the term "water source" refers to any source of water, either natural or man-made. Examples of water sources include oceans, gulfs, bays, lakes, rivers, streams, creeks, reservoirs, sewers, water tanks, water pipes, effluent from industrial plants, wastewater collection systems, wastewater treatment plants, etc.

For purposes of the present invention, the term "water stream" refers to any flow of water or waterway. Examples of water streams include natural flows of water such as a creek, stream, river, etc., or flows of water in a man-made conduit such as a canal, pipe, weir, flume, sewer, channel, etc.

For purposes of the present invention, the term "water system" refers to a water stream, a water source or combination of one or more water streams and/or one or more water sources. Examples of water systems include wastewater collection systems, sewer systems, wastewater treatment systems, etc.

For purposes of the present invention, the term "water treatment core facility" refers to a central facility that processes, treats, generates, etc., water in contrast to a broader collection or distribution system, such as a central wastewater treatment plant, for the processing or treatment of wastewater, or a water treatment facility, such as a facility for the generation of potable drinking water.

For purposes of the present invention, the term "water treatment system" refers to any system designed or used to process, treat or generate water or a water-based product for a particular application. A "water treatment system" may be used to generate water having a predetermined, desired or preferred set of characteristics, qualities or properties, such as purity, etc. For example, a "water treatment system" may include a water treatment facility for generating and distributing potable drinking water for the public, a system designed to generate water for a manufacturing process, etc. In the case of a water treatment facility for generating potable drinking water, the water treatment system may further include a distribution system for distributing potable drinking water to the public. A "water treatment system" may also be any system used to process or treat a water-based substance into a product that may be discharged into the environment, such as a central WWTP, etc. In the case of a WWTP, the water treatment system may further include a collection system for collecting wastewater and funneling it into the central WWTP. Water treatment systems may include public or municipal systems or private systems dedicated to an industry, factory or particular real estate development. For example, a water treatment system may include any system, plant or facility that uses equipment based on advanced separation, filtration, dialysis, ion exchange processes or any other basis, technology or mechanism for processing, treating, detecting, purifying, isolating, separating, etc., water according to relevant parameters.

For purposes of the present invention, the term "web-enabled application" refers to an application that is run from the Web or Internet. A web-enabled application may be run within a web browser, may run on a web server, may output HTML for display on the Web, may launch a web browser to retrieve specific web page, etc.

For purposes of the present invention, the term "web server" refers to the conventional meaning of those terms, i.e., a computer that helps deliver content to another computer, a user, a visual display device, etc. that can be accessed through the Internet. In one embodiment of the present invention, a water quality monitoring system includes a communication server to interact with the remote loggers and samplers, a web server to display a user interface to an Internet browser that is display on a visual display device, and a database server that does not have external access.

Description

Water quality monitoring systems often include sensors that measure the concentration of ions in the solution. The solution can be aqueous or organic in nature. One commonly monitored ion is the hydronium ion; however, any cation or anion can be of importance to a water quality monitoring system.

The quality of water is highly influenced by the concentration of hydronium ions ($H_3O^+$, or $H^+$), or pH, of the reaction environment. The pH of a solution is also often referred to as the acidity of the fluid being tested. By definition, $pH=-\log[H_3O^+]$, or the negative log of the molar concentration of hydronium ions. On the pH scale, a very acidic solution has a low pH value, such as zero or one, corresponding to a large concentration of hydrogen ions ($H^+$). In contrast, a very basic solution has a high pH value, corresponding to a very small number of hydrogen ions (or to a correspondingly large number of $OH^-$ ions). A neutral solution, such as substantially pure water, has a pH value of about seven.

The presence of the correct concentration of acid in a solution can induce many forms of catalysis, such as, but not limited to, acetal formation, acetal hydrolysis, dehydration of alcohols, amide hydrolysis, epoxide ring opening, ester hydrolysis, esterification, ether formation and glycoside formation. The correct pH concentration can also include catalysis of hydration including, but not limited to, alkenes, alkynes, nitriles, nucleophilic acyl substitution and nucleophilic addition to aldehydes and ketones.

The pH of potable drinking water is a required reporting parameter of many governments, and effluent water pH ranges are strictly controlled. For example, in the United States the Environmental Protection Agency sets specific ranges for potable water discharge; if the water pH is outside the range, the water can be unsafe for human and animal consumption.

Water is also required for steam generation in nuclear reactors. The boilers of these nuclear reactors operate at extremely high temperatures that require a very high quality of water. It is critical that the process system is monitored properly to avoid expensive boiler cleanings and the associated downtime. Such systems may also include the need to monitor hazardous boiler chemicals, such as hydrazine, requiring highly qualified personnel. These examples highlight the importance of monitoring water supplies not only to ensure sufficient water quality, but also to avert costly equipment repair or replacement.

Water quality is also important for many manufacturing processes. For example, the manufacturing of semiconductors requires an ultra-pure water quality. Again, it is critical that the water supply is monitored properly to avoid latent defects in the manufacturing of products, such as semiconductors.

As yet another example, monitoring water quality is also important to avoid or lessen the consequences of equipment failure or deliberate tampering (such as by terrorist act) in contaminating the water supply. Adequate monitoring may help to catch any such contamination of the water supply to avoid harm and to ensure that appropriate action is taken.

Some embodiments of the present invention relate to automated task monitoring and control in logging, flow monitoring and aqueous sampling devices. In some embodiments, the present invention relates to a flow and sampling apparatus server monitor that performs scheduled tasks which allow for automated action if there is a deviation from the preset telemetry guidelines.

Various types of water quality monitoring systems have been employed that monitor various parameters. For example, U.S. Pat. No. 5,633,809 to Wissenbach et al., entitled "Multi-function flow monitoring apparatus with area velocity sensor capability," issued May 27, 1997, describes a multi-function monitoring apparatus capable of measuring flow-related variables of fluid in a channel on the basis of signals from any one or more of a plurality of different types of flow sensors. Such different types of flow sensors may include, for example, a pressure sensor, a submerged pressure transducer, an ultra-sonic transducer and/or a velocity sensor forming part of an area-velocity sensor system, each of which sensors may be selectively connected to the apparatus as needed to accommodate various monitoring conditions. The apparatus is further capable of monitoring various conditions of fluid in the channel, such as pH level, ORP, temperature, solution conductivity, dissolved oxygen and the like. Data including flow-related data and fluid condition data, as well as data from external devices, may be transferred from the data memory of the apparatus to an external computer, printer or the like by use of a data transfer unit, modem, satellite or cellular device integrally provided in the apparatus. The apparatus includes liquid velocity measurement unit based upon Doppler technology, comprising a spectrum analyzer for calculating average fluid velocity, and a means for verifying the calculated average fluid velocity based upon the calculated maximum fluid velocity value. But Wissenbach et al. does not describe an automated task monitoring and control in logging, flow monitoring and aqueous sampling. The entire contents and disclosure of Wissenbach et al. are incorporated herein by reference.

U.S. Pat. No. 3,824,550 to Schoenwitz, entitled "Read-only memory storage apparatus controlling data logging apparatus," issued Jul. 16, 1974, describes a supervision system with a central station connected to a plurality of remote stations wherein information obtained from the remote logging stations is logged or printed out on a data logging apparatus or printer in accordance with a format previously established. But Schoenwitz does not describe an automated task monitoring and control in logging, flow monitoring and aqueous sampling. The entire contents and disclosure of Schoenwitz are incorporated herein by reference.

U.S. Pat. No. 5,487,314 to Phillips, entitled "Water sampling apparatus," issued Jan. 30, 1996, describes a Kemmerer-style water sampler with a tubular body open at both ends through which a connecting rod extends. One end of the connecting rod is fixed to a lower closure and has a latch mechanism at its other end coupled to an upper closure. The latch mechanism is releasable by means of an actuator which is movable in response to the application thereon of a tensile force in a direction to release the latch and enable the closures to move to body-sealing positions. But Phillips does not describe an automated task monitoring and control in logging, flow monitoring and aqueous sampling. The entire contents and disclosure of Phillips are incorporated herein by reference.

The publication "Hach Company Sigma 930T Literature No. 3467," the entire contents and disclosure of which are incorporated herein by reference, describes a remote communications flow meter. The Sigma 930T is a remote flow monitoring apparatus that monitors various parameters of a dynamic water source. The apparatus can continuously monitor data in real-time and provides for managing user-set alarms, level measurement and Doppler-based flow measurement. The Sigma 930T logs information within the guidelines preset by the user. Applications include, but are not limited to, permanent collection system monitoring, long-term flow monitoring, sanitary sewer evaluation studies, and CSO and SSO studies and monitoring. But this publication does not describe an automated task monitoring and control in logging, flow monitoring and aqueous sampling.

Accordingly, there has not heretofore been described an apparatus and method for server monitoring of logging, and water monitoring devices, having the features and advantages provided by the present invention.

In some embodiments, the present invention provides a water monitoring apparatus that includes one or more environmental instruments located remotely from one or more servers. The environmental sensors communicate wirelessly with the Internet as well as with the one or more servers. The one or more servers may communicate via the Internet with the user via a web browser and/or the environmental instruments. The one or more servers include a communication server including a server monitor that can monitor the environmental instruments and execute one or more preprogrammed tasks based upon the data from the environmental instruments.

In some embodiments of the present invention, the environmental instrument may be a logger. In some embodiments of the present invention, the environmental instrument may be a sampler. In some embodiments of the present invention, the environmental instrument may be a smart sensor.

In some embodiments of the present invention, the one or more environmental instruments may be connected to the one or more servers by a hard-wired connection.

In some embodiments, the present invention provides a water monitoring method that employs one or more environmental instruments which are located remotely with respect to one or more servers that include a communication server. The communication server receives the data from the environmental instruments and monitors the data within preset guidelines. The one or more servers send task instructions to the one or more environmental instruments to perform tasks. After performing the tasks, the environmental instruments send data obtained by performing the tasks to the one or more servers. The one or more servers analyze the data from the environmental instruments and perform internal tasks and/or send tasks instructions to environmental instruments to perform tasks based on the data obtained by the environmental instruments.

FIGS. 1, 2, 3, 4 and 5 and the following detailed description of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific details disclosed herein are not to be interpreted as limiting, but merely as a basis for the claims and as a representative basis for teaching one skilled in the art to variously employ the present invention. As a result, the invention is not limited to the specific examples described below, but only by the claims and their equivalents.

FIG. 1 shows a monitoring apparatus 102 according to one embodiment of the present invention that includes a remote environmental instrument 112, i.e., a logger and/or sampler, at a first location 114. Environmental instrument 112 is connected to a communication server 116, i.e., a call in server, at a second location 118 via the Internet 120 by a wireless communication link 122 that includes a cellular tower 124. Wireless communication link 122 is bidirectional as indicated by double-headed arrow 126. Communication server includes a server monitor 128. Data received by communication server 116 is transmitted to web server 130 at a third location 132 via a bidirectional communication link, indicated by doubled-headed arrow 134. Communication server 116 and web-server 130 each have respective bidirectional communication links, shown by double-headed arrows 136 and 138, respectively, with a server database 140. A user 142 has access to a visual display device 144, i.e., a laptop computer, at a fourth location 146 that is in communication with a web server 130 via a bidirectional communication link, indicated by double-headed arrow 148, over the Internet 120.

The second and third locations may be the same location, i.e., communication server 116 and web server 130 may be at the same location.

An example of one operation of monitoring apparatus 102 will now be explained. Environmental instrument 112 is scheduled to perform a task such as calling in to communication server 116 at a predetermined time. Server database store a task schedule for communication server 116 listing the times at which each environmental instrument in water quality monitoring apparatus 102 is scheduled to call in to communication server 116. In executing a "missed call" task, server monitor 150 continuously queries server database 140 to determine if any of the environmental instruments, including environmental instrument 112, have failed to call in within the primary interval for the environmental instrument, i.e., that the environmental instrument has malfunctioned. If server monitor 150 determines that environmental instrument 112 has not called in with the primary call interval, communication server 116 saves this information in server database 140 and communicates this information to web server 130, which sends out an alarm that is displayed on visual display device 144. The primary interval may be a preset setting of environmental instrument 112, a time set by server monitor 128, a time set by user 142, etc.

A server monitor can be, but is not limited to being, extensible so that new tasks can be designed and "plugged-in" at a later time. Information that identifies the task and its schedule are stored in a server database that is either part of the server or linked to the server, including the server monitor. The monitoring process of the server monitor may be run in a never-ending loop where the server monitor queries the server database for one or more tasks that are scheduled to run for various environmental instruments of a water quality monitoring system based on the task schedule and the current time on the server, including the server monitor. After a task is executed, the current time and results of the task are saved to the server database so that historical records may be maintained.

Although only one environmental instrument is shown in FIG. 1, in some embodiments of the present invention, there may be any number of environmental instruments. The logger can communicate to the communication server 104 by any mode of communication, including but not limited to cellular, satellite or hard-wired transmission.

An example of an operation of a monitoring apparatus having multiple environmental instruments that is similar in operation to monitoring apparatus 102 will now be described. A server monitor monitors all environmental instruments that have been given the task to connect to a communication server on a schedule determined by the primary call interval of each environmental instrument. This task may be a preset setting of the particular environmental instrument, a time set by the server monitor, a time set by a user, etc. If a period of time passes that exceeds the primary call interval for a particular environmental instrument, the server monitor determines that the environmental instrument missed its scheduled connection to the communication server. An adjustable "alarm trigger" for each environmental instrument is stored in the server database. This value specifies the number of consecutive missed connections that must occur before the missed call alarm is "set" for that environmental instrument. The missed call alarm will remain "set" until the environmental instrument makes a successful connection to the communication server. At that time, the alarm will be "cleared." Each time that the missed call alarm state changes, data is stored in the server database so that historical records of missed call alarms for every environmental instrument are maintained. The current "set" or "cleared" state for each instrument can be retrieved from the server database at any time. The status of each environmental instrument status may be displayed in reports and dashboard/status screens accessible through by one or more users via a web site maintained by a web server. A list of users who want to receive missed call alarm notifications is maintained in the database. Each user can select the environmental instruments for which the user wants to receive notifications. For each environmental instrument, the user can specify whether the user wants to receive the missed call alarm notifications via e-mail, SMS, both or any other communication means. When the missed call alarm state for a particular environmental instrument changes from "cleared" to "set," alarm set notifications are sent. Alarm "cleared" notifications are sent when the missed call alarm state changes from "set" to "cleared."

Figure 2:
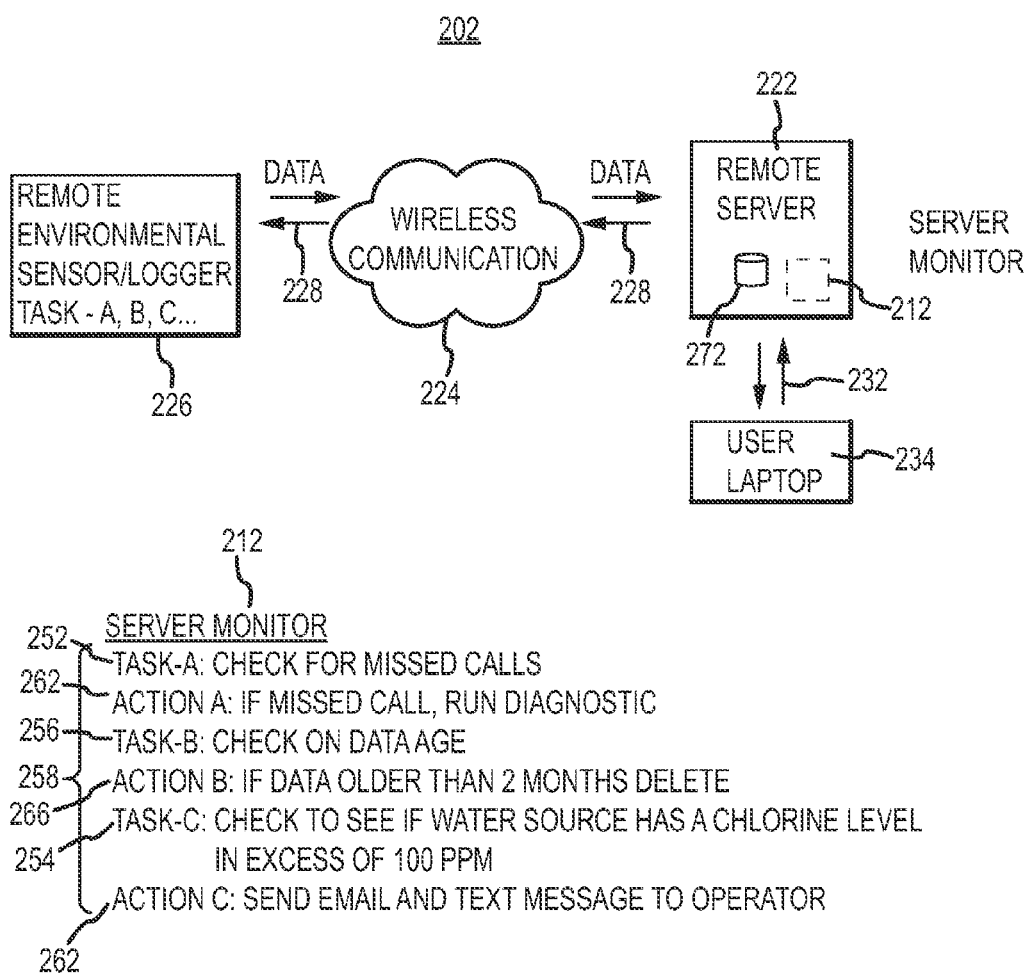
FIG. 2 is a diagram that illustrates a monitoring apparatus according to one embodiment of the present invention.

FIG. 2 shows a monitoring apparatus 202 according to one embodiment of the present invention that includes a server monitor 212. Server monitor 212 is part of a remote server 222 that is connected via wireless communication link 224 to an environmental instrument 226, i.e., a sensor and/or logger. Remote server 222 functions as a communication server, a host server and a web server/alarm transmission server. Wireless communication link 224 is bidirectional, as indicated by arrows 228. Remote server 222 is also connected by a communication link 232 to a user's visual display device 234, i.e., a laptop computer. Communication link 232, which may be wireless or hard-wired, is bidirectional as indicated by arrows 236. Server monitor 212 runs a number of server tasks, i.e., tasks 252, 254, 256 on a task schedule 258. Associated with tasks 252, 254 and 256 are respective actions 262, 264 and 266. Information relating to tasks 252, 254 and 256, actions 262, 264 and 266, and task schedule 258 is stored a server database 272 on remote server 222. Server monitor 212 executes a continuous loop where it queries a server database 272 for a task that it is scheduled to run based on task schedule 258 and the current time on remote server 222. After a task is executed, the results are saved into server database 272 for historical information.

Tasks can involve the operation of environmental instrument 226. For example, task 252 allows server monitor 212 to monitor for missed calls from environmental instrument 226 to remote server 222. If one or more calls have been missed, server monitor 212 sends instructions to environmental instrument 226 to perform action 262, i.e., run diagnostics on remote server 222 and/or environmental instrument 226. Task 254 allows server monitor 212 to check and see if a water source monitored by environmental instrument 226 has a chlorine level in excess of 100 ppm. If the chlorine level exceeds this amount, server monitor 212 sends an e-mail and text message to the user's visual display device 234. In addition, tasks can involve activities involving only the server. For example, a task 256 checks on the age of data in server database 272. For any data older than two (2) months, server monitor 212 instructs server 222 to perform action 266, i.e., delete the data older than two (2) months. Alternatively, action 264 could be to archive data older than two (2) months.

Although only one server is shown in FIG. 2, there may be any number of servers involved in the operation of a server monitor. For example, there could be a separate communication server and web server, as shown in FIG. 1.

Although only three tasks are shown in the task schedule in FIG. 2, there may be any number of tasks. There are also many and varied types of tasks that may be performed in addition to the tasks shown in FIG. 2. For example, a task could include publishing data from the environmental instrument to any number of visual display devices/users. Although only one action is shown for each task in FIG. 2, there may be any number of actions associated with each task.

In another embodiment of the present invention similar to the embodiment shown in FIG. 2, one or more environmental instruments are preprogrammed by a server monitor to pull pH readings from the environment in which the environmental instrument(s) are located. The server monitor reviews all incoming data that is logged into the server database. If the pH deviates from a predetermined (pre-set or stored) parameter, the server monitor can execute a predetermined action associated with the pH monitoring task. For example, the server monitor can send a task instruction to the environmental instrument that, due to the change in pH readings, the environmental instrument should now start to take and store samples. The historical data, server database, tasks, and any other information about the environmental instrument can be accessed via the Internet by any number of users via a web browser on a visual display device.

Figure 3:
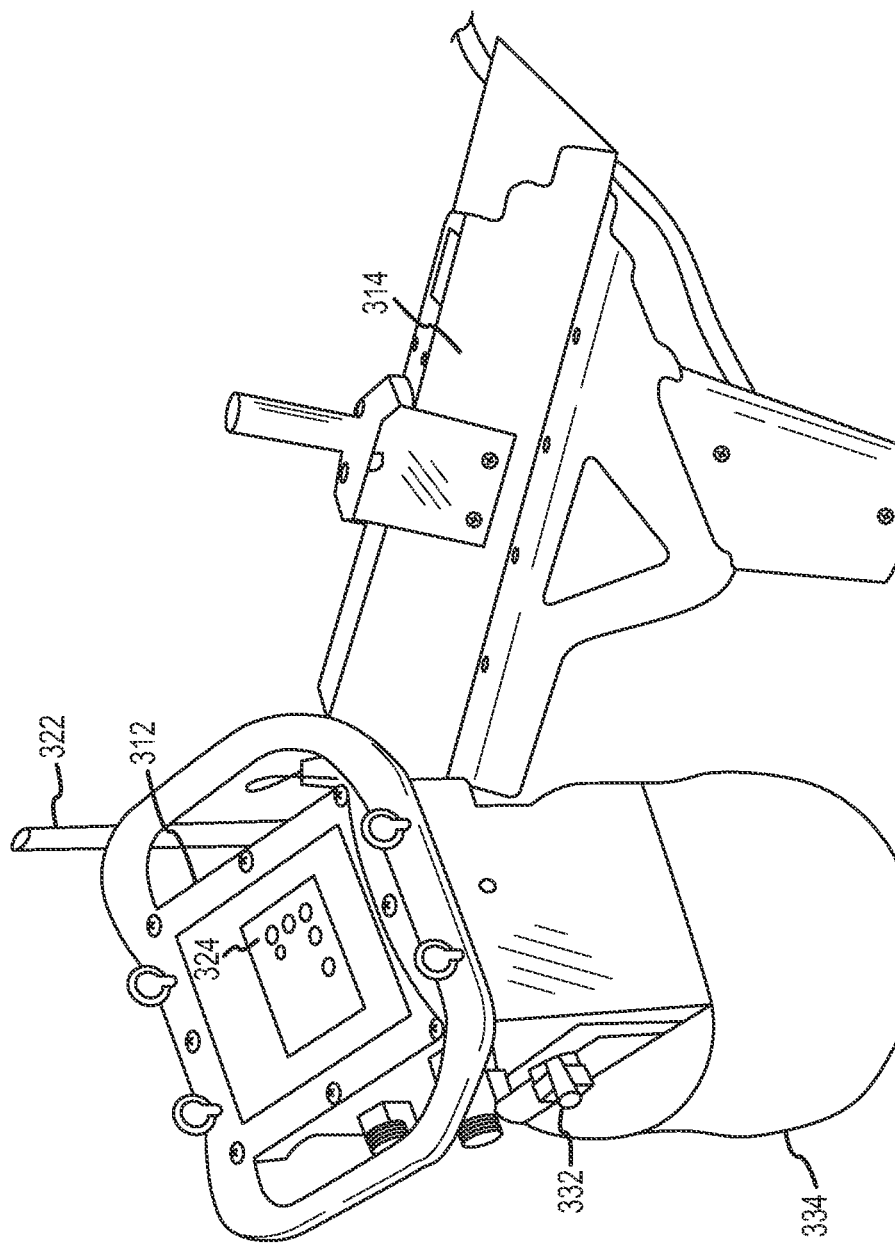
FIG. 3 is a drawing of a logger and a flow monitoring apparatus according to one embodiment of the present invention.

FIG. 3 shows a logger 312 and a flow monitoring apparatus 314 according to one embodiment of the present invention. Logger 312 can communicate with other parts of the server platform wirelessly using antenna 322. Logger 312 includes a display 324, attached sensors 332 and attached battery packs 334.

Although the logger in FIG. 3 is shown with one display, a logger may have no display or multiple displays. The logger may also have any number of sensors attached and any number of battery packs attached.

Figure 4:
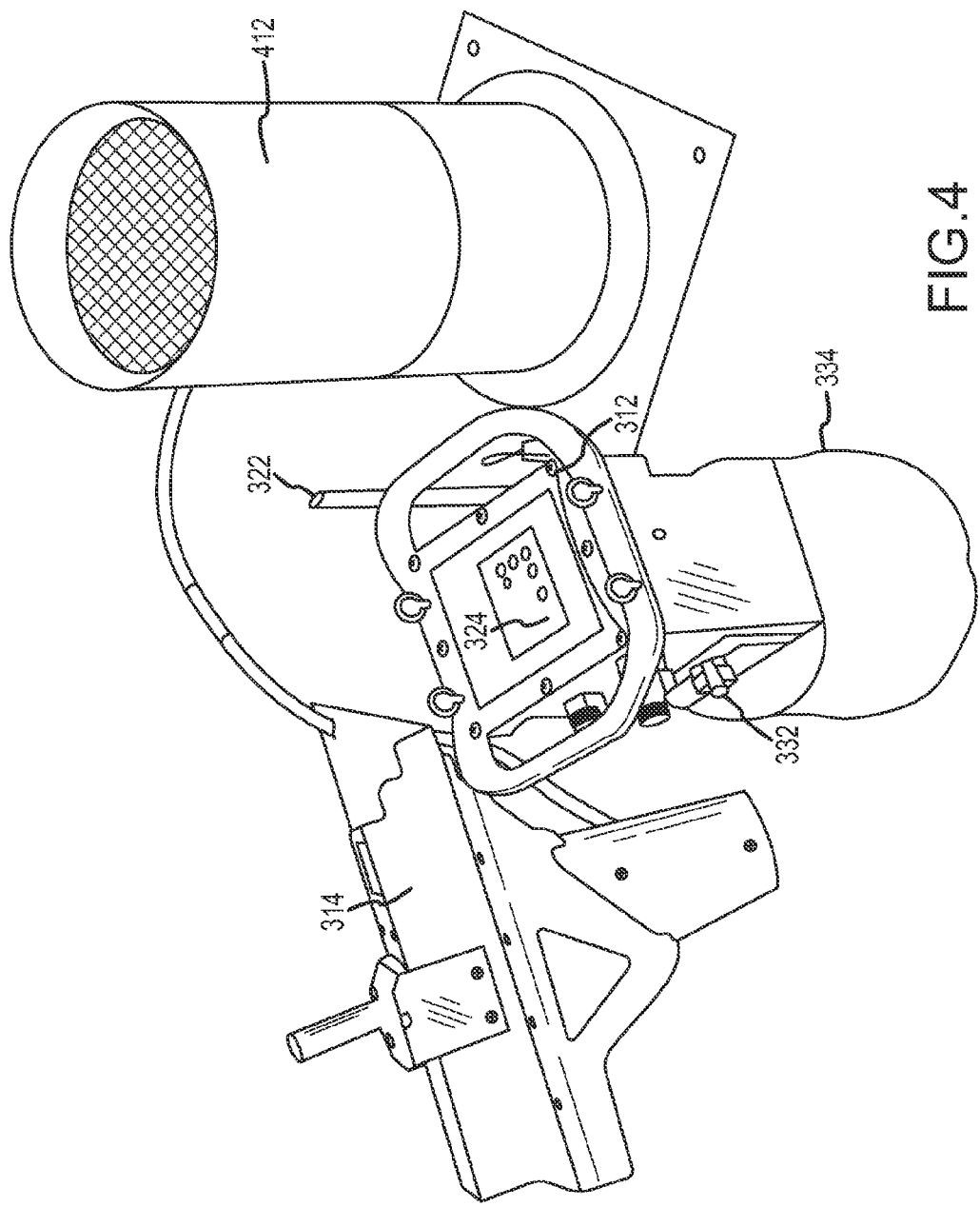
FIG. 4 is a drawing of the logger and flow monitoring apparatus of FIG. 3 and a rain gauge according to one embodiment of the present invention.

FIG. 4 shows logger 312, flow monitoring apparatus 314 and a rain gauge 412 according to one embodiment of the present invention.

Figure 5:
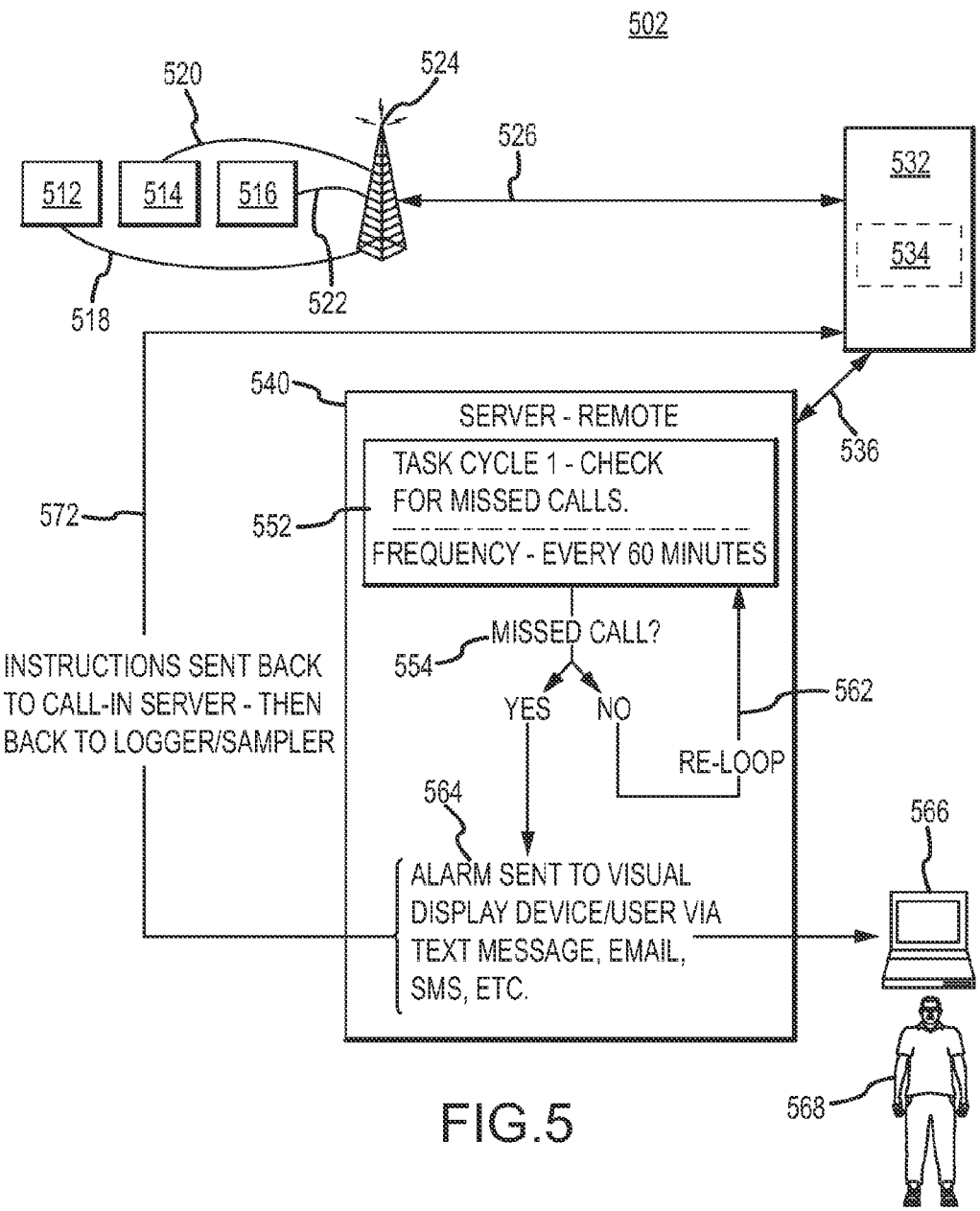
FIG. 5 is a diagram illustrating the function of a monitoring apparatus including samplers, loggers and a server according to one embodiment of the present invention the invention.

FIG. 5 shows a monitoring apparatus 502 according to one embodiment of the present invention that includes three environmental instruments, i.e., environmental instruments 512, 514 and 516 that are each a combination of a logger and a sampler. Environmental instruments 512, 514 and 516 are wirelessly connected by communication links 518, 520 and 522, respectively, to a cellular tower 524. Cellular tower 524 is connected by a wireless communication link 526 to a server 532 that functions as a communication server. A server monitor 534 is part of server 532, so server 532 functions as a host server as well. Server 532 is connected by communication link 536 to a web server 540. Communication link 536 may be a wireless link or a hard-wired link. Server monitor 534 may run in a loop 552 that checks for calls from the environmental instruments 512, 514 and 516 at step 554. If there is not a missed call, the loop continues to cycle, as indicated by arrow 562. If there is a missed call, then server monitor 534 executes an action 564, i.e., to send an alarm to a visual display device 566 to alert a user 568 that there has been a missed call and a possible malfunction of the environmental instrument. The alarm may be sent to visual display device 566 as any form of visual communication such as a text message, e-mail, SMS, etc. As part of action 564, instructions are sent back to server 532, as indicated by arrow 572, then back to the environmental instrument with the missed call along wireless communication link 526 and the appropriate wireless communication link 518, 520 or 522.

Figure 6:
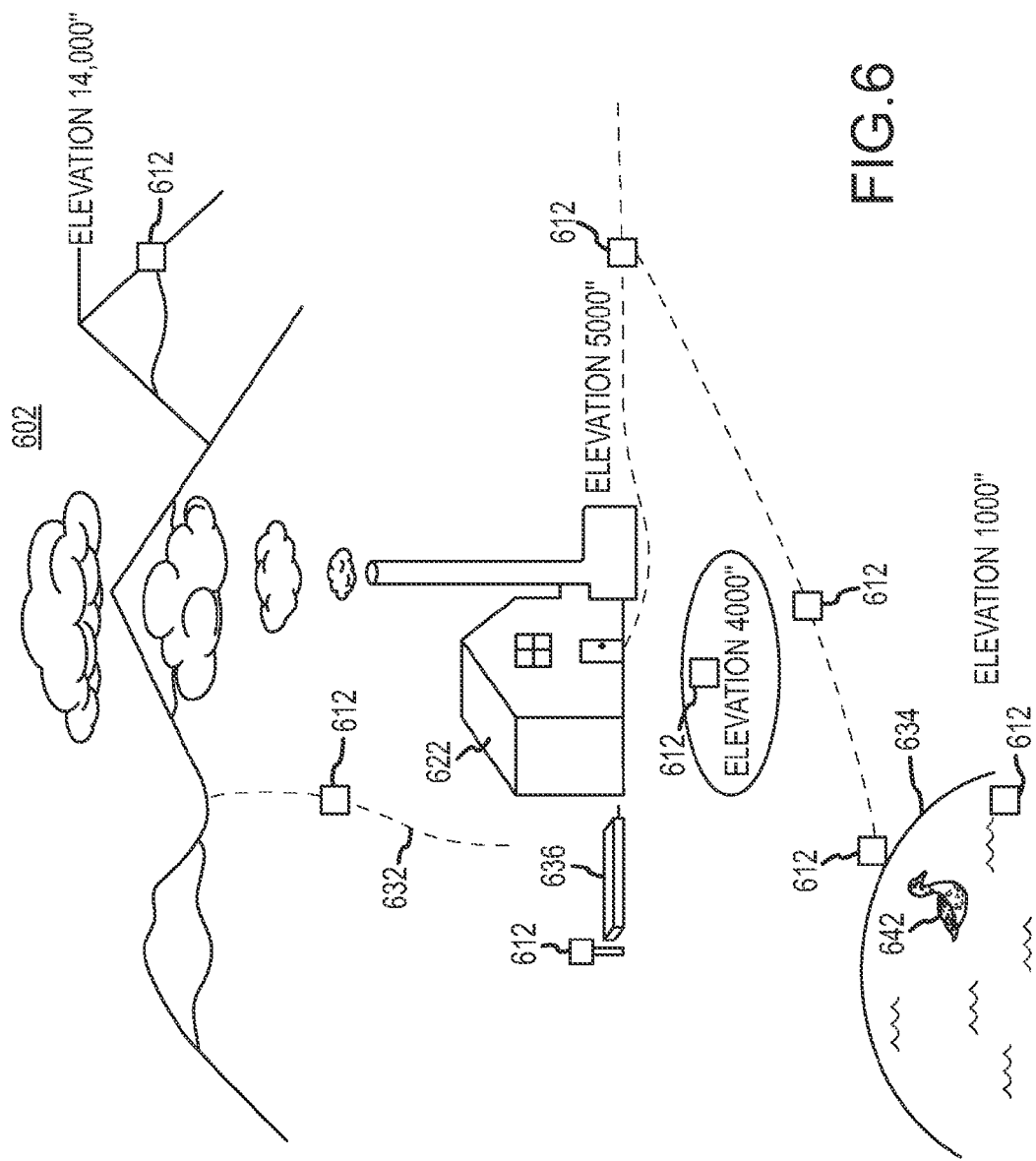
FIG. 6 is a diagram illustrating the functioning of several loggers and samplers arranged around a pharmaceutical plant for environmental monitoring according to one embodiment of the present invention.

FIG. 6 shows an apparatus 602 according to one embodiment of the present invention including several environmental instruments 612 arranged around a pharmaceutical plant 622 for environmental monitoring. Each of the environmental instruments 612 is a combination of a logger and a sampler. Environmental instruments 612 are around all local waterways such as the local stream 632, a local pond 634 and a waste pond 636. A user (not shown) may be interested in monitoring water used by wildlife 642 that is in close proximity to a pharmaceutical plant 622. The server monitor of a server (not shown) in communication with the user and in wireless communication with environmental instruments 612 can monitor the activity of all of the environmental instruments, i.e., environmental instruments 612. The server monitor can integrate the data to inform the user about the environment in which the wildlife 642 exists. This may include, but is not limited to, changes in water temperature, pH, chlorine, dissolved oxygen, ORP, turbidity and any other water parameter. Based upon the water parameters, the server monitor can execute any number of tasks, and, possibly, actions to be deployed in any number of environmental instruments.

Figure 7:
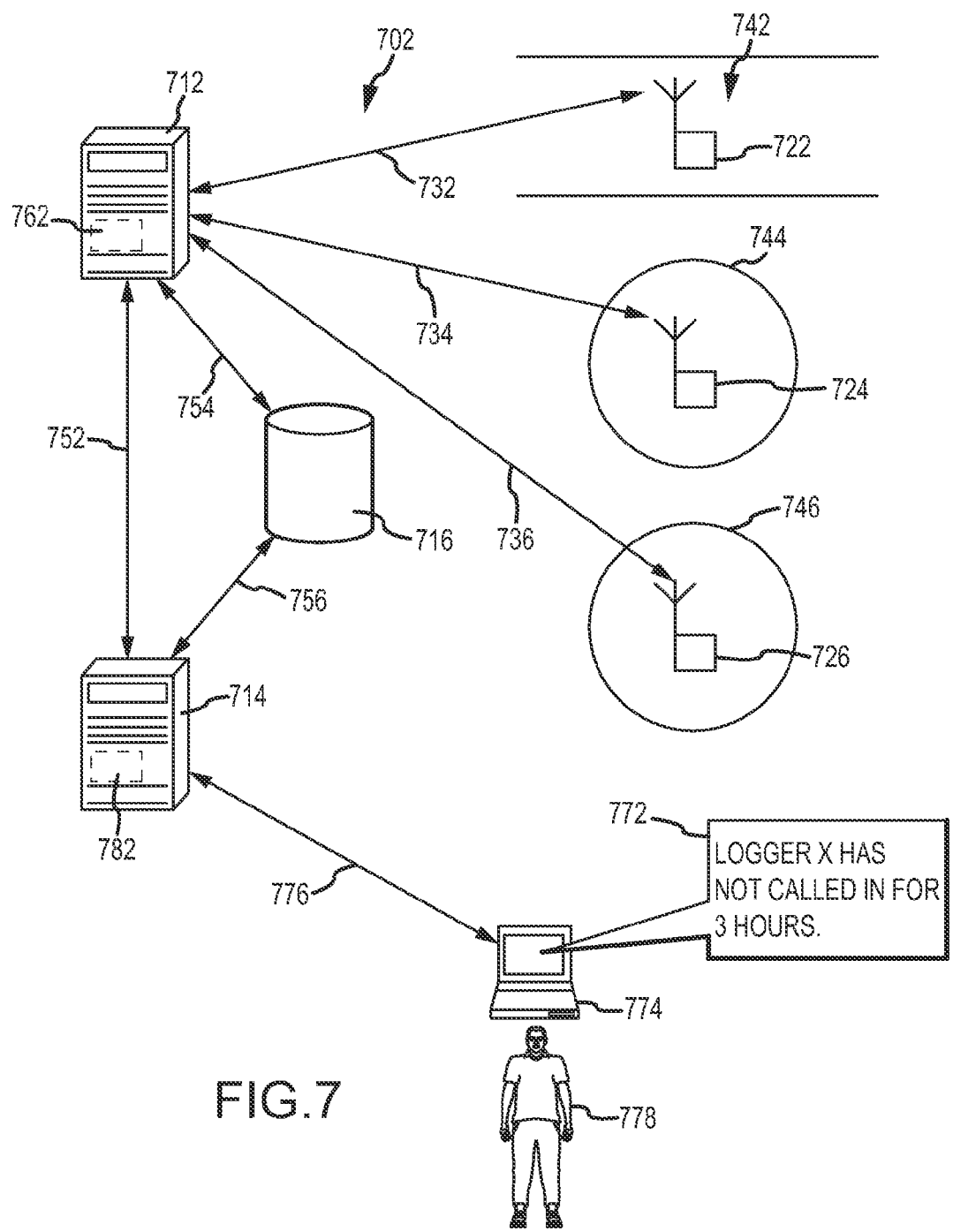
FIG. 7 is a schematic diagram that illustrates how a water quality monitoring apparatus reports to a user according to one embodiment of the present invention.

FIG. 7 shows a water quality monitoring apparatus 702 according to one embodiment of the present invention that includes a communication server 712, a web server 714, a server database 716 and three (3) loggers, i.e., loggers 722, 724 and 726. Loggers 722, 724 and 726 communicate with communication server 712 via respective wireless bidirectional communication links 732, 734 and 736. Logger 722 is located in a river 742, logger 724 is located on a manhole 744 of a wastewater collection system and logger 726 is located on a manhole 746 of the wastewater collection system. Communication server 712 is in communication with web server 714 via a bidirectional communication link 752. Communication server 712 is in communication with server database 716 via a bidirectional communication link 754. Web server 714 is in communication with server database 716 via a bidirectional communication link 756. Communication server 712 includes a server monitor 762 that continuously queries server database 716 for a single task that is scheduled to run by logger 722, logger 724 or 726 based on the task schedule and the current time on communication server 712. Each of the three (3) loggers has its own primary call interval, such as every 30 minutes, every 60 minutes, every 2 hours, etc., in which the logger is scheduled to call into communication server 712. If one of the loggers does not call in to communication server 712 for a predetermined number of times, such as twice, three times, etc., then communication server 712 saves this information to server database 716 and sends this information to web server 712. Web server 714 then sends an alarm message 772 to a visual display device 774 via a wireless bidirectional communication link 776. Visual display device 774 displays alarm message 772 to a user 778. Web server 714 includes water quality monitoring software 782 that allows alarm message 772 from web server 714 to be displayed on visual display device 774.

An example of a application that may be modified for use with embodiments of the present invention to display information about the water quality monitoring system to a user on a visual display device is the water quality management software FSDATA™ manufactured by Hach Company.

FIG. 8 shows a call schedule 802 for a server monitor (not shown) displayed on a screen 812 of a visual display device (not shown) according to one embodiment of the present invention. Call schedule 802 may be generated modifying a water quality management software such as FSDATA™ to display the required information on the visual display device based on calls and missed calls from environmental instruments monitored by the server monitor of a communication server. Call schedule 802 displaying call and missed call information for six (6) environmental instruments, i.e., loggers 1, 2 and 3 and samplers 1, 2 and 3. Each environmental instrument has a primary interval and an alarm trigger value (number of missed calls before alarm is sent) that may be set or modified by the user. For example, sampler 2 has a primary call interval of 15 minutes and an alarm trigger value of four (4). As shown in call schedule 802, the last scheduled call was not made by sampler 2, but no alarm has been sent to the user, because this was only the first missed call by sampler 1 and the alarm trigger value is four (4) missed calls before sending an alarm to the user.

Many forms of electrochemical sensors may be used in the systems of the present invention to detect the presence and concentration of ions in water. For example, the carbon nanotube sensors described in U.S. patent application Ser. No. 12/952,392 to Salzer et al., entitled, "Carbon Nanotube Sensor," filed Nov. 23, 2010, may be used in systems of the present invention, and the entire contents and disclosure of this application are incorporated herein by reference.

Other sensors that may be employed in the systems of the present invention include the pH sensors described in U.S. Pat. No. 4,650,562 to Harman, entitled "Reference electrode device," issued Mar. 17, 1987, and the entire contents and disclosure of this patent are incorporated herein by reference.

According to some embodiments of the present invention, examples of sensors that may be used with the remote water quality monitoring system may include any sensor known or used in the art. In addition to the variables listed above, the one or more sensors may be used to measure water level and/or flow velocity using any technology either known or later developed in the art. Such measurements may, for example, be used in combination to determine volumetric flow rate along with other known conditions and constants. For example, a sensor may also include a rain gauge. Examples of flow velocity or area flow velocity sensors that may be used with embodiments of the present invention may include wafer sensors and any sensor based on Doppler or ultrasonic, radar, pressure flow, electromagnetic (EM), magnetic (e.g., surcharge), etc., technology or detection. Examples of level, height or depth sensors that may be used with embodiments of the present invention may include any based on ultrasonic (look-down, submerged look-up, in-pipe, etc.), pressure (e.g., bubbler, surcharge, diaphragm displacement, etc.), radar, etc., technology or detection. According to some embodiments of the present invention, a height or level sensor may be combined with other structural elements or devices, such as flumes and weirs, to deduce other measurements or states, such as velocity in addition to water level, based on known relationships and constants. According to some embodiments of the present invention, any of the one or more sensors may further include an internal or external temperature sensor to provide, for example, auto correction for effects of temperature on any primary measurement by the sensor. According to some embodiments of the present invention, there may be a number of sensors at a particular location that obtain environmental data that may be jointly fed into an environmental instrument, such as a logger.

According to various embodiments of the present invention, the one or more sensors detect or measure one or more of the following qualities of water in a water supply or water stream: temperature, chemical composition, total organic carbon (TOC), fluid quantity, flow rate, waste product, contaminant, conductivity, pH, dissolved oxygen, pressure, turbidity, permeate flow, chlorine or fluorine concentration, water or tank level, or equipment status or operation. The one or more sensors may be located at a plurality of locations within a particular geographic area.

According to some embodiments of the present invention, the one or more sensors may include any products on the market, sold, made by or branded under, for example, Hach™, Sigma™ or American Sigma™, Marsh-McBirney™, etc., either known or later developed in the art. Particular examples of the one or more sensors may include FLO-DAR®, FLO-TOTE®, FLO-MATE®, etc., sensors. For additional description of some types of sensors, see, e.g., U.S. Pat. Nos. 5,506,791; 5,633,809; 5,691,914; 6,208,943; 5,644,088; 5,811,688; 5,544,531 and 5,315,880, the entire contents and disclosures of which are incorporated herein by reference.

Electronic sensors may be used to detect or measure the amount of storage, discharge pressure and flow from a stream of water. Other parameters may be determined by analytical tests. Many of the sensors used to continuously monitor water streams are based on advanced separation processes employing ion-selective membranes which concentrate the analyte for detection. For example, detection of chlorine may be mediated via an ion-selective membrane which may readily and specifically pass an analyte, such as free chlorine or hypochlorous acid (HOCl), thus separating and concentrating the analyte from the bulk solution. The sensors may incorporate multiple sensors as part of a single detector unit.

According to some embodiments of the present invention, the only communication link between the server and the environmental instruments and remote users of the remote water quality monitoring system is a wireless communication link. Several benefits and advantages may be achieved by physically separating the storage, manipulation, analysis, reporting, etc., functions of the server and/or server database of the present invention from the site(s) or location(s) of data collection (i.e., sensors) within a remote water quality monitoring system.

According to some embodiments of the present invention, the server may be any type of computer, processor or device able to (1) at least temporarily collect, assemble, store, aggregate, etc., data from one or more sensors, and (2) transmit data or information to a server (or a server database associated with the server) via a mode of communication. Thus, a server may contain or include (1) a memory device(s) to collect, assemble, store, aggregate, etc., the data at least temporarily, (2) one or more ports or inputs for receiving data or information either directly or indirectly from one or more sensors, and (3) a transmission interface(s) to transmit data or information to a server. Such a server may further have the ability to process, manipulate, analyze, etc., the data obtained from the one or more sensors, such as by an analyzer or software located on the server, prior to transmission of data or information to the server and/or server database. The data sent from the server to the remote user/visual display device may be observational data synthesized from data derived from one or more environmental instruments.

According to some embodiments of the present invention, the logger may include one or more sensor ports for receiving data through cables, wires, etc., from one or more sensors. Alternatively, such a logger may be capable of receiving data wirelessly from one or more sensors. To store or log (at least temporarily) data or information received ultimately from the one or more sensors and/or manipulated or analyzed, the logger may include any type of memory device, such as a drive, flash or SIM card, etc. Thus, the logger may further include an analyzer or software to analyze or manipulate the data received from the one or more sensors. The logger may have a transmission interface, such as wireless connectivity or antenna or other connection outputs, for communicating via wireless transmission to a server.

According to some embodiments of the present invention, the analyzer may be one or more software program(s) on the server and/or the environmental instrument. Such an analyzer may perform analysis, calculation, comparison, manipulation, etc., of the data to generate an output, such as an analysis result, an analysis report, an alarm, etc., relevant to the monitoring of a stream of water, and the analysis, calculation, comparison, manipulation, etc., may be performed continuously, in real-time, at periodic or selected intervals, on condition or on demand. According to some embodiments of the present invention, an analyzer may be used to make calculations based on a combination of raw data from multiple sensors. When the analyzer is located on an environmental instrument, the analyzer may be used to generate or synthesize observational data derived from raw data obtained from a plurality of sensors. For example, independent data measurements of (1) flow rate and (2) water level by multiple sensors may be combined and used to calculate volumetric flow (in units of volume per time) based on the known dimensions and other constants regarding a water channel, pipe, etc., at a site within a water stream. Such multiple sensors used to measure volumetric flow may be connected to a common environmental instrument, such as a logger.

According to some embodiments of the present invention, the logger may have inputs, connectors or ports for a one or more environmental instruments that may be automatically detected for plug-and-play options. The logger may be able to store or log data for a greater number of values or measurements than ports, such as up to 16 values. Each sensor port may receive data from a sensor comprised of multiple individual sensors. The logger may have different power options, such as battery power, auxiliary (external) battery power, reusable source (e.g., solar panel, etc.) and/or power from the electrical grid which may be combined with power switching (i.e., using battery or auxiliary power as a backup). The logger may have additional inputs, connectors or ports for receiving auxiliary power or a data communication link for connecting to a user computer or laptop. The logger may also have a user interface for providing basic indications/information, such as device or sensor status, connections, etc. The logger may be water-tight, enclosed and/or have a rugged construction, may contain a desiccant to control moisture within the device and/or may include a means for mounting the device. An example of a flow logger may include any FLO-LOGGER® product known in the art.

According to some embodiments of the present invention, the data may be transmitted to the server via an electronic control system connected with or coupled to the one or more sensors using any suitable wireless mode of communication. For example, a section of ladder logic or function block program code may be inserted into the code base of the electronic control system which directs the electronic control system to send specified data to the server and/or database. The communications protocol may be any protocol that is supported by the electronic control system which facilitates the transmission. For example, RSLinx®, a software program from Rockwell Software, may be operative on the server database computer to facilitate the transmission by a PLC. Alternatively, any number of commercial communications drivers may be used, such as those produced by commercial providers such as Kepware®, Wonderware®, etc. In the case of an electronic control system typified by SCADA® or HMI® products, such as Wonderware®, RSView®, WinCC® and other similar products, code blocks may be added to the control code to allow the operating program to collect and send data to the server. Thus, the steps of collecting data locally, possibly storing it temporarily, and subsequently transmitting this data to a server may be incorporated into the electronic control system.

According to some embodiments of the present invention, the data may be transmitted to a server via a computer that is part of an environmental instrument, such as a sampler either directly or through an electronic control system connected to or coupled with the one or more environmental instruments. According to these embodiments, the environmental instrument may transmit the data acquired or collected directly or indirectly from the one or more sensors to the server by any suitable mode of wireless transmission.

According to some embodiments of the present invention, after the data and information obtained from the one or more environmental instruments have been sent to the server of the water quality monitoring system, the server may analyze or manipulate the data to generate an output, such as manipulated data, an analysis result, an analysis report, an alarm, etc. Alternatively, the environmental instrument may analyze or manipulate the data obtained from the one or more sensors, and the data may then be transmitted to the server and the server may then further analyze or manipulate the data and information to generate an output. However, the output may be generated, presented, uploaded, etc., by the server without further analysis or manipulation by the server. The analysis, manipulation, etc., of the data may be performed by an analyzer, such as a software program or routine, firmware and/or hardware, that may be housed on the environmental instrument, the server and/or the server database associated with the server.

According to some embodiments of the present invention, the one or more sensors may be optionally integrated into or connected to an electronic control system. Examples of an electronic control system may include an in-house supervisory control and data acquisition system (SCADA) or a programmable logic controller (PLC). The electronic control system may be composed of any available commercial devices for converting analog to digital, such as analog-to-digital boards, specifically designed for the purpose of converting instrument readings or data to computer-readable form. Thus, the remote water quality monitoring system of the present invention may utilize existing instrumentation and control systems as well as existing communication devices. The electronic control system may perform basic analysis of the raw data to produce an analysis parameter that may then be sent to the server. According to some embodiments of the present invention, the electronic control system may continuously scan the sensor data and automatically log and archive the data at specified intervals. According to some embodiments of the present invention, raw data obtained from a sensor may be stamped or labeled with time and location information, such as a unique identifier(s), for aiding subsequent analysis or manipulation. Raw data obtained from a sensor may also be labeled according to the particular order in which the data are sent to a server. According to some embodiments of the present invention, the electronic control system may include a transmission interface which functions to transmit the data to the server.

According to some embodiments of the present invention, a local configuration file on the environmental instrument may "tell" a program in the environmental instrument which of the register addresses of the electronic control system to access, any scaling factor that needs to be applied, a physical description of the data being collected, etc. The data set collected may then be converted into a form for transmission, such as a comma delimited string value, and perhaps stored locally and possibly encrypted for security on a storage medium such as a hard disk, etc.

According to some embodiments of the present invention, the data and information obtained by an environmental sensor may be manipulated by a processor in the environmental sensor to generate an output, such as an analysis result, report, alarm, etc., that may be communicated to a user/visual display device via a server. Such data or information transmitted from an environmental instrument may include observational data which is calculated, manipulated, etc., by an analyzer on the environmental instrument from data derived from one or more environmental instruments. According to some embodiments of the present invention, the data and information may be analyzed, manipulated, etc., by analyzer(s) located on remote environmental instruments.

According to some embodiments of the present invention, a server database or software-implemented server database may be associated with the one or more servers for storage of data. The server database may be on the server or exist as a separate unit, and the number of server(s) and/or database(s) may be varied to suit a particular application, network traffic or demands of a particular client. According to some embodiments of the present invention, for example, the one or more servers may comprise a computer, an FTP server, a server database, and/or a web or Internet server, which may each be located at the same or different locations and use any available and appropriate operating systems. This storage on the server database may take many forms such as flat files, spreadsheets, and relational or non-relational databases. According to some embodiments of the present invention, the server database may be a relational database, such as Microsoft SQL Server or Oracle database products.

According to some embodiments of the present invention, the data may be wirelessly transmitted between the environmental instruments, the server(s) and/or the user/visual display device continuously, in real-time, at periodic or selected intervals, on condition or on demand by a user. The data also may be encrypted for additional security and may be decoded by the server and/or the server database and placed in the appropriate locations.

According to some embodiments of the present invention, the data may be transmitted to the server by environmental instruments comprising the one or more sensors. According to these embodiments, the one or more environmental instruments may be fitted with communications processors which enable the sensors to send data directly to the server. Suitable environmental instruments may include sensor assemblies having a transmission interface effective for real-time data transmission, such as a LonWorks® network variable interface. Suitable sensors may also include, for example, the Six-CENSE™ and the CT-CENSE™ manufactured by Dascore, Inc., as well as the multi-sensor devices manufactured by Sensicore, Inc. In this example, sensors may transmit the data to a server by any suitable wireless mode of communication, such as a cell network.

According to some embodiments of the present invention, data may be displayed or presented as an output, such as an analysis result(s) and/or analysis report(s), in a predetermined format, which may then be sent to a user, such as, for example, a consumer, public official, authorized personnel or regulatory agency. Indeed, the data may be manipulated and formatted into an output or analysis report as required for submission to a regulatory agency. According to some embodiments of the present invention, the analysis or manipulation of data may be presented as an output that is uploaded onto a web server and made accessible via a web browser for presentation to, for example, a public official, consumer or interested member of the public. Alternatively, according to some embodiments of the present invention, an output in the form of an alarm may be sent to alert a user of a problem or deviation from normal conditions.

According to some embodiments of the present invention, one or more output(s) may be sent, presented or uploaded to one or more remote viewing device(s) in one or more formats having different levels of sophistication or complexity based on their intended recipient(s) or user(s), even if such one or more output(s) relate to the same data or information. According to some embodiments of the present invention, an output, such as an analysis result or analysis report about current data, may be presented alongside and/or in comparison to historical records. An output may also be used to present scheduled and predicted maintenance reports. For example, the output may provide or present preconfigured performance information, maintenance, quality assurance, quality control, regulatory, cost reports, performance evaluation, graphing, historical trends, regulatory reports, plant or facility process, operating and economic information, indications and scheduling for preventive maintenance, troubleshooting, etc. According to some embodiments of the present invention, access to an output of the present remote water quality monitoring system may depend on the security measures in place, such as a login and password or other identifying criteria.

However, according to some embodiments of the present invention, a simplified presentation of the data in an output of the remote water quality monitoring system may be beneficial to even a trained remote user. Accordingly, a graphical and/or color-coded presentation of the data or analysis or manipulation of the data may potentially be used in any output format or report. A graphical presentation may include any suitable graphical format, such as tables, pie charts, bar graphs, etc., that may aid in the presentation of the output or report. Color coding may be used, for example, to provide an indication of normal or abnormal operation, as well as warning status or alarm conditions. An output of the remote water quality monitoring system may also show data or analysis or manipulation of the data in a geographical layout or form to help track or pinpoint the origin or cause of a problem. Historical data or expected values may also be shown with current data for comparison. When an output is provided to a trained remote user, the data and/or analysis may be presented as an exception report showing all instances in which data triggered an alarm or was close to a trigger point.

According to some embodiments of the present invention, when an output is sent or presented to management, the outputs or reports may be generated for three primary management levels: (A) process systems operations, (B) plant quality assurance (QA)/quality control (QC), and (C) financial oversight. For instance, an output or report for operations of a process system may contain information necessary to monitor, maintain, supervise and troubleshoot process plant system performance. In this manner, typical information and parameters may include, if applicable, flow rates, pressures, delta pressures, permeate and/or ion exchange quality, pH, alarm conditions, tank levels and a graphical presentation of applicable process performance parameters and trends.

According to some embodiments of the present invention, an output including data, analysis results, analysis reports, etc., may be sent to a remote viewing device using any appropriate or suitable wireless mode of communication. The output may be in any suitable file format, such as but not limited to html, jpeg, gif, pdf, etc., based on the output type and/or remote viewing device. The output may be sent in a suitable and/or tailored format to preselected recipients, such as authorized personnel, law enforcement and/or regulatory agencies, in the event of an emergency or abnormal condition or operation. The content of the output may be kept confidential, and access to the output, including data, analysis results, analysis reports, etc., may be controlled by encryption or by the use of appropriate account names, protocols and passwords. Multiple parties or persons may be notified of, have access to or receive outputs from the remote water quality monitoring system, thus allowing redundancy in sending notifications, alarms, analysis results, analysis reports, etc.

According to some embodiments of the present invention, the wireless mode of communication for sending an output to, or allowing access to an output by, a remote viewing device may vary and may use any suitable technology. For example, according to some embodiments of the present invention, an output including data, analysis results, analysis reports, etc., may be uploaded to an Internet or a web server for access, visualization or downloading by a remote viewing device, such as by using a web browser. According to some embodiments of the present invention, the Internet server or web server may be the server of the remote water quality monitoring system or may be a separate computer or server. According to some embodiments of the present invention, the output may be uploaded to an Internet server or a web server for access with little or no manipulation or analysis by the server, visualization, or downloading by a remote viewing device by a user. According to these embodiments, for example, the data or information derived from the one or more sensors may first be analyzed or manipulated by the environmental instrument prior to being transmitted to the server. By making the output available on an Internet server or a web server, the communication or dispersion of the output, including data, analysis results, analysis reports, alerts, alarms, etc., may be greatly facilitated and may involve any interested or authorized recipients. For example, any authorized recipients may access data, analysis results, analysis reports, alerts, alarms, etc., of the output on a webpage by accessing the data, information, output, etc., asynchronously from the Internet server computer. Furthermore, the output, including data, analysis results, analysis reports, alerts, alarms, etc., may be continuously or regularly updated and made available in near-real-time.

According to some embodiments of the present invention, the wireless mode of communication for sending an output to, or allowing access to an output by, a remote viewing device may include other suitable technologies, such as, for example, by facsimile, file transfer protocol (FTP), voice or text messaging, text-to-voice telephone messages, electronic mail, pager, human voice calling, SMS messages, instant messaging or groupware protocols, the Internet, a cellular network, wireless or satellite communication, radio communication, etc. Examples of visual display devices that may be used by a remote user with various embodiments of the present invention may include, for example, personal computers, servers, etc., as well as a variety of personal communications equipment, such as PDAs, cell phones, pagers, BlackBerrys®, Palm® devices, iPhones®, etc. According to some embodiments of the present invention, the remote viewing device may be the same as the server of the present remote water quality monitoring system.

Another advantage of some embodiments of the present invention, for example, is the ability to send an output or other data, information, etc., about a water stream to a remote viewing device via a wireless mode of communication, which may reduce the need for operators or authorized personnel to visit the site of the water stream being monitored, maintained, etc. This may reduce the costs associated with monitoring a water stream if data had to be collected locally or by direct connection to a device or environmental instrument. This is especially true if the remote water quality monitoring system is further combined with sensors and other devices that require less maintenance and service, such as sensors that do not contact the water and are able to operate reliably for longer periods of time without maintenance or service.

According to various embodiments of the present invention, the wireless mode of communication between the environmental instruments and the server, between the environmental instruments at different locations, between the server and visual display devices at remote locations, etc., may vary and may be accomplished via one or more of the following: the Internet, TCP/IP, Ethernet, file transfer protocol (FTP), e-mail, SMTP, cellular phone networks, radios or remote terminal units (RTU) coupled to radio frequency transmitters, satellite transmission, a wireless network, a wide area network (WAN), a wireless local area network (WLAN), etc. According to some embodiments of the present invention, the data may be transmitted from the environmental instruments to the server continuously, in real-time, at periodic or selected intervals, on condition or on demand by a user.

Some of the embodiments of the present invention may be used to monitor a water treatment system. Such a water treatment system may comprise a water treatment core facility that is a water treatment facility for the distribution of potable drinking water to the public, and the water treatment system also may comprise a distribution system. According to some embodiments of the present invention, the water treatment system may comprise a water treatment core facility that is a WWTP, and the water treatment system may further comprise a collection system.

Municipal drinking water may be obtained from a variety of sources that can be made potable by use of proper water treatment equipment. For example, a reverse osmosis system may be used to lower the total dissolved solids from sea water with minimal pretreatment to produce potable drinking water. Despite the sophistication of pretreatment of seawater, improper monitoring or operation can allow the seawater to quickly foul membranes. If fouling occurs, but is found quickly, the membranes may be cleaned, and complex and costly water contamination and associated water treatment repairs may be averted. However, if the fouling is not detected quickly through proper monitoring, the membranes can be irreparably damaged, and expensive partial or total membrane replacement would be required. The cost of unplanned membrane replacement, not including the lost revenues typically associated with downtime, can make such a system cost prohibitive.

Increasingly, the need for pure water is causing more and more municipalities to install wastewater recovery processes to recycle municipal WWTP effluents back into water of suitable quality to be used for potable drinking water or irrigation. For example, such recovery processes may recover secondary treated municipal effluents using reverse osmosis, then inject the recovered effluents back into an aquifer. More and more of these installations are being planned throughout the United States and the rest of the world.

One difficult aspect of treating municipal wastewater effluent is that neither the flow rates nor the mix of contaminants is constant. This is particularly true for a municipal WWTP with collection systems that include a variety of industrial discharge sources in addition to the usual sanitary discharges from homes, businesses, schools, and so on. While the sanitary discharges are well characterized in terms of composition and treatability, the addition of industrial wastes means that the WWTP must plan for a wide variety of contaminants. In general, most WWTP systems cannot deal effectively with every situation. Even with excellent design and engineering, the large fluctuation in the type and quantity of contaminants reaching the WWTP often results in varying levels of effective treatment of the discharge from the WWTP. For a tertiary water recovery plant treating the effluent from the WWTP, this can be particularly difficult, because many contaminants are not readily removed even by processes such as reverse osmosis. In addition, certain contaminants can also foul reverse osmosis, ultrafiltration and microfiltration membranes, causing loss of performance or membrane damage. Therefore, it is important that waste water treatment plants be monitored to ensure that contaminants are properly removed before discharge or reuse of effluents back into the environment to thereby avoid damage to expensive equipment.

Another application in which water quality is important is with wastewater treatment plants. The treatment and subsequent recycling of wastewater is a cornerstone of the quality of life in the industrialized world. Cities, industries and agricultural operations produce large quantities of wastewater, all of which must be treated to some degree to remove contaminants or pollutants before the water is suitable for recycling or discharge into the environment, such as streams, rivers or oceans. In metropolitan areas, central wastewater treatment plants must treat water from a variety of sources including city, industrial and agricultural wastewater. In many cases, generators of industrial wastewater are required to install and operate wastewater treatment plants at their own sites before discharge into central water collection systems. At the central water collection system, industrial wastes generally may be mixed with domestic or city wastewater and other untreated waste sources. These mixed wastes are then transported to the central wastewater plant or sewage treatment facility for final treatment before discharge.

Some embodiments of the present invention also provide a system and method for remotely monitoring, storing, analyzing, manipulating, uploading, reporting, etc., information and data relating to water quality and/or treatment derived from raw data obtained from a plurality of sensors of a water treatment system, which may be strategically placed to gather data or information necessary for analysis or manipulation. Such information and data may be remotely stored, manipulated, etc., on one or more servers, and/or stored on one or more removed databases, which may be associated with the one or more servers. A water treatment system, according to some embodiments of the present invention, may include any system designed or used to generate water or a water-based product having a predetermined, desired or preferred set of characteristics, qualities, properties, etc., for a particular application, such as, for example, a municipal potable drinking water treatment facility, a system generating water for a manufacturing process, etc., as well as any distribution system. A water treatment system may also include any system designed or used to process or treat a water-based substance into a product discharged into the environment, such as, for example, a central WWTP, etc., as well as any collection system. Water treatment systems may include public or municipal systems as well as systems dedicated to a real estate development. For example, a water treatment system may include any system, plant or facility that uses equipment based on advanced separation, filtration, dialysis, ion exchange processes or any other basis, technology or mechanism for processing, treating, detecting, purifying, isolating, separating, etc., water according to relevant parameters.

According to some embodiments of the present invention, the one or more sensors may be used to obtain relevant raw data about the operation of a water treatment system and/or the quality of water being processed, treated, received, distributed, etc., that would be relevant to the analysis, manipulation and evaluation of the data in generating an output, such as an analysis result, analysis report, alarm, etc. For example, each of the one or more sensors may be used to measure, quantify or detect the following characteristics, conditions, qualities, properties, etc., of water. Examples of characteristics, conditions, qualities, properties, etc., of water that may be measured by the one or more sensors may include, but are not limited to: water temperature, chemical composition including total organic carbon (TOC), total suspended particles, quantity, flow rate, and types and amounts of waste(s) such as those commonly discharged into streams from wastewater treatment or industrial sites. Further examples of characteristics, conditions, qualities, properties, etc., of water that may be measured by the one or more sensors may include one or more contaminants, conductivity, pH, pressure, turbidity, permeate flow, dissolved oxygen, chlorine or fluorine concentrations, tank or water levels, and equipment status and operation. According to some embodiments of the present invention, the one or more sensors may be chosen to generate data or information for a regulatory report necessary to enable a regulatory agency to determine operational parameters and quality and quantity of the treated water such as water production rate (flow), treated water consumption rate (flow), treated water storage volume, reserve capacity (at current production and consumption rates), final treated water quality, reports and archive data for regulatory compliance and/or QA/QC (quality analysis/quality control) documentation.

According to some embodiments of the present invention, raw data about the operation of a water treatment system or the characteristics, conditions, qualities, properties, etc., of water processed or treated by a water treatment system may be acquired, collected, detected, measured, etc., by one or more sensors or probes placed at one or more sites or locations within or throughout the water treatment system, such as a plurality of locations within or throughout the water treatment system, that may include locations in the field, i.e., in a collection or distribution system. Sensors may be strategically placed to gather relevant data and information at appropriate sites or locations and/or provide logical functional groupings for review and analysis.

According to some embodiments of the present invention, once the data is analyzed or manipulated into an output, such as an analysis result or analysis report, the output may be sent by any known, available and/or suitable wireless mode of communication from the server to a remote viewing device for viewing by a user. According to some embodiments of the present invention, the output may be sent to the remote viewing device or accessed by the remote viewing device continuously, in real-time, at periodic or selected intervals, on condition or on demand. For example, the output may be a notification, alarm or alert, such as an Alarm Event, sent on condition of an emergency or abnormal, harmful or dangerous quality, state or condition relating to a water stream. Such an output may include a notification of failures, shutdowns, exceeding of critical parameters, equipment damage, etc. Alternatively, for example, the output may be composed as an analysis report, which may be in a format for submission to a regulatory and/or law enforcement agency. The remote water quality monitoring system may send, present or upload an output as a weekly, monthly, yearly, etc., summary of performance, water quality or other information that may be reviewed by management for the water treatment system or by elected officials, customers, vendors or members of the public. Alternatively, the remote water quality monitoring system may send, present or upload an output continuously, on condition or on demand of a user. When sent or presented, the output may reflect or show updated information and recently collected data.

According to some embodiments of the present invention, the format and sophistication of the presentation of the output will likely depend on the intended recipient(s) or user(s). For example, an output, which may include any relevant information, data, analysis results, analysis reports, etc., about the operation of a water treatment system or the quality, properties, etc., of water processed or treated by the water treatment system, may be presented in a more sophisticated form when presented to internal management or operators of the water treatment system than when presented to elected officials, customers or members of the public.

According to some embodiments of the present invention, the output may be used to report or present information or analysis of the operation or conditions in a WWTP, particularly as the output relates to health and safety concerns. The analysis result may take many different forms; however, one form may be a prediction of the water composition and flow rate in terms of selected parameters of interest that may arrive at a WWTP as a function of time. Thus, for example, the server may be operable to calculate a predicted concentration of various components at the time of their arrival at a central WWTP and compare the computed values with pre-established and/or historical parameters.

According to some embodiments of the present invention, the output may be a report submitted to a regulatory agency in a required format, such as visual graphs, statistical reports or a compliance calendar, to meet the reporting requirements of the agency, and such reporting or sending of the output may be performed automatically. Quality and safety standards for potable water are regulated by the Environmental Protection Agency (EPA) in accordance with the Public Water System Supervision program. The standards are enforced by local agencies. There are over 170,000 water districts in the United States that provide public drinking water to 90% of Americans. The EPA issues primary standards designed to protect public health against substances that may be harmful to humans if consumed. EPA secondary standards ensure that aesthetic qualities of water, such as taste, odor or clarity, are met. However, each water district remains responsible for monitoring the drinking water itself to ensure that it meets all drinking water standards. The treatment processes for drinking water must be monitored as well. Therefore, the remote water quality monitoring system of the present invention may be useful not only in monitoring whether these standards are met on a routine and continuous basis, but also in providing automatic generation of regulatory reports as an output to an agency in the required format.

According to some embodiments of the present invention, the output of the remote water quality monitoring system may be a regulatory report sent to the Department of Homeland Security and/or law enforcement agencies in situations appearing to suggest deliberate tampering with a water treatment system, such as by an act of terrorism. Embodiments of the present invention may be able to carry out sophisticated calculations, manipulations, analyses, etc., to detect tampering events and perhaps distinguish those events from normal malfunction or mismanagement.

According to some embodiments of the present invention, the output may be in any format and may incorporate a tabular or graphical display as may be suitable to facilitate or focus the presentation of the data or analysis or manipulation of the data for a particular user. According to some embodiments of the present invention, the output of the remote water quality monitoring system may be a simplified presentation for a non-technical user who is untrained or lacks detailed knowledge about the operation of a water treatment system, such as a customer, elected official or member of the public. For example, municipal water treatment plants are ultimately the responsibility of elected officials. Yet these officials rarely have the technical training or time to allow them to directly access the performance parameters of the systems for which they are responsible. Embodiments of the present invention may easily be used to provide a readily understandable presentation output of the current performance of a municipal water treatment system. Such an output may be made accessible to the public, such as via the Internet by uploading onto a web page, thus allowing interested members of the public to monitor the operation of their own drinking water plants, as desired. In providing a simplified presentation of the data to the non-technical user, operating parameters may be color-coded and displayed graphically or in a tabular format, etc.

The presence or absence of turbidity in the water supply may greatly affect the amount of disinfectant required to achieve inactivation of biological organisms. The suspended particles producing turbidity are usually removed in the water treatment process before disinfection agents are applied. However, turbidity breakthroughs do occur, and failure to quickly raise the disinfection dose level may lead to insufficient disinfection residuals reaching the distribution system. This may present a threat to public health, particularly if the drinking water supply is contaminated either deliberately or inadvertently.

For example, in the context of a water treatment facility for providing potable drinking water to the public, data regarding disinfectant concentration and turbidity from both the treatment facility and the distribution system may be analyzed, and historical information as well as known constants may be used to predict expected conditions at points downstream within the distribution system based on expected lag times and the effluent conditions from the treatment facility. For example, data may be collected from the water treatment facility about relevant information, such as chemical dosing rates, filtered water turbidity, chlorine residual, etc., as well as data from sensors in the distribution system, such as chlorine residual, etc., may be used for comparison. With historical data as a reference point, one can calculate a chlorine demand from the chemical dose rates, flows and residual using the current data. Chlorine demand may be defined as the actual amount of chlorine that is reacting, typically calculated as free chlorine dosed less the residual chlorine. Chlorine demand may be correlated with temperature, season and filtered water turbidity. Additionally, residual chlorine leaving the plant may be correlated with residual chlorine within the distribution system. If the actual chlorine residual measured at the distribution system point of measurement varies from the historical values expected from the chlorine residual leaving the treatment facility by more than a set percentage or number of standard deviations, then an alarm or alert may be issued by the remote water quality monitoring system according to some embodiments of the present invention.

As another example in the context of a water treatment facility providing potable drinking water to the public, data obtained from the one or more sensors may be combined with known system constants such as flow rates, residence times and so on to continuously generate a calculated product of disinfectant concentration times contact time C*T. This simple factor alone is quite useful in predicting the amount of biological organism deactivation.

As another example in the context of a WWTP, an analysis or manipulation of data obtained from sensors at upstream locations in a collection system, such as sites or locations of discharge from water treatment or industrial wastewater plants, to detect the amount of contaminants or pollutants, may be used to predict the future composition and flow rate of water arriving at the central WWTP. This may be accomplished in a simple manner by using known or expected constants and information as well as historical records about transit time, flow rates and patterns, etc., from each of the relevant sites or locations upstream, such as within the collection system and at or near points of discharge. Any results, conclusions, reports, etc., generated using such an analysis or manipulation may be used to alert operators of a central WWTP receiving wastewater from the collection system of a potential overload so that appropriate precautions and changes in operation may be made. As will be readily appreciated by those skilled in the art of data analysis, this can provide a powerful indicator of either normal conditions expected at the WWTP or out-of-bounds conditions that may require immediate action and notification of responsible parties.

According to other embodiments of the present invention, the projected or remaining life of equipment, such as a membrane, may be determined or estimated by the remote water quality monitoring system based on operational performance data. Efficiency levels for equipment or a water treatment system as a whole may be determined by the remote water quality monitoring system relative to a theoretical potential or efficiency, which may be based on a theoretical minimum water, power and chemical consumption versus actual consumption calculated. In addition, financial and economic reports may be generated based on performance and/or consumption data. Furthermore, the data may be analyzed and compared to federal and/or state regulatory requirements for water quality and environmental protections.

A plant QA/QC output or report, for example, may contain information necessary to enable plant managers to effectively manage downstream manufacturing or distribution processes. In addition, quality assurance personnel may be able to monitor the quality and quantity of the treated water to confirm compliance with specifications and standards. Information in this report may typically include treated water production rate (flow), treated water consumption rate (flow), treated water storage volume, reserve capacity (at current production and consumption rates), final treated water quality, reports and archive data for regulatory compliance and/or QA/QC documentation.

Financial oversight may be achieved with a plant economic output or report that may contain information needed by managers with profit-and-loss or budget responsibility to effectively track the cost of operation and to identify budget variances when they occur, to permit timely corrective action. For this purpose, the data parameters contained in a plant economic report may include calculated power consumption (expressed in kWh and actual cost in local currency) that is computed on the basis of user's supply pump/motor efficiencies both as a year-to-date measurement and as a percentage of the prior period and variances both actual and budget/actual versus prior period. The parameters may also include calculated chemical consumption (expressed in volume consumption and as converted to local currency) and computed based on the user's supplied chemical dose rates and integrated feed water flow rates. This may be shown in the output or report as a year-to-date measurement, as a percentage of the prior period, or as variances of both actual and budget/actual versus prior period.

According to some embodiments of the present invention, an analyzer on the environmental instrument, the server and/or server database associated with the server may also interpret and consider any identifier(s) or configuration files associated with the data that may indicate or identify the origin, location and time of the data capture from the one or more sensors. The analysis and calculation of the data may further be performed by the analyzer to determine or indicate performance, evaluation, preventive maintenance, scheduling, optimization and troubleshooting of the operation of the water treatment system or equipment, in addition to monitoring water quality. For example, the data may be compared to known or expected performance data or parameters to calculate a differential, which may be used to determine whether the water treatment system is performing within a normal range or out of bounds if a predetermined differential is exceeded. Such comparisons may be based on the amount or concentration of, for example, a disinfectant, contaminant or pollutant present at different locations in a water treatment system. If the differential is exceeded, then appropriate persons, operators and/or agencies may be alerted. Alternatively, for example, the data may be compared to known, expected or historical data or values to determine if the operation of the water treatment system is optimized.

According to some embodiments of the present invention, the analyzer may convert the data into a consistent set of units, and thus translate all values into a common format, such as pounds per square inch (psi) for pressure, etc., using a unit's conversion sub-program to allow for appropriate comparisons and calculations. Furthermore, the data may be normalized to specific configurations and conditions for a water treatment system. For example, the feed pressure may be critical in determining the future and current performance of a system in reference to its performance when new. For reverse osmosis membranes, changes in pressure are related to age, production rate and temperature and vice versa. Thus, a change in flow rate may or may not indicate that the overall system's performance has changed when normalized and compared to its performance when new or recently cleaned. Prior to this invention, the complex mathematics for these conversions required some manual intervention on the part of the operator to compute the normalized conditions. Embodiments of the instant invention may do this automatically and report normalized data to the output.

According to some embodiments of the present invention, the analyzer or software of the present remote water quality monitoring system may be used to make any suitable statistical inferences, derivations, conclusions or predictions from the data, especially based on a comparison to historical data or expected values. Such an analysis or manipulation of the data may provide an indicator of either normal or abnormal operation of a water treatment system or characteristics, properties, qualities, etc., of water processed or treated by a water treatment system. According to some embodiments of the present invention, the analyzer may be used to predict conditions, such as the presence, quantity or concentration of a disinfectant, contaminant, or pollutant at a downstream location at a later point in time based on data obtained from sensors at upstream locations within a water treatment system.

According to some embodiments of the present invention, the data acquired or collected from the one or more sensors may be compared by the analyzer to expected or historical performance data or records and/or to any known values and constants, such as known or expected transit times, location-specific flow rates and patterns and distances within different portions of a water treatment system, known physical and chemical properties and characteristics of water, contaminants, disinfectants, pollutants, etc., using any known equations, algorithms, etc., which may be used to model, predict or compare the performance of the water treatment system or the quality of water processed or treated by the water treatment system. Data acquired or collected from the one or more sensors may be compared to each other and/or to historical data, and calculations may be performed to generate an output, such as one or more analysis results, etc. According to some embodiments of the present invention, the analyzer or software may perform any calculation, computation, comparison, analysis, etc., that would be relevant, suitable or appropriate to monitoring the operation of a water treatment system or the processing or treatment of water in a water treatment system.

One advantage of some embodiments of the present invention is that remote storage and manipulation of water quality and treatment data may make the operation of a water treatment system safer and less susceptible to tampering or control by unauthorized individuals or outsiders by separating the operation and control of the water treatment system from the data analysis, manipulation and/or communicating or reporting functions of the present invention. For example, this feature may be useful in detecting direct tampering, such as an act of terrorism, by an individual or outsider, with a water treatment system. According to some embodiments of the present invention, since the server of the remote water quality monitoring system is physically separated from the operation of the water treatment system, it is unlikely that an individual tampering with a water treatment system would also have access to the remote water quality monitoring system, especially since access to the remote water quality monitoring system may be controlled or password protected. According to some embodiments of the present invention, if a hacker were to remotely access the remote water quality monitoring system of the present invention, the hacker would not be able to directly access and control the operation of the water treatment system because the server and database are external, physically remote and not connected to the process facility being monitored, except perhaps via a wireless mode of communication.

Yet another advantage of some embodiments of the present invention is that data and information may be combined, pooled, compiled, etc., from sensors placed at multiple locations or sites throughout a water treatment system and in the field as part of a broader distribution or collection system. According to some embodiments of the present invention, sites or locations within the distribution or collection system may be considered part of the water treatment system, even though the distribution or collection system may operate independently of a water treatment core facility of the water treatment system. Such sensors located at the multiple locations or sites may operate independently and/or have no communication between sensors other than the remote water quality monitoring system of the present invention. By comparing data from these multiple independent sites or locations, a more advanced form of analysis and conclusions may be performed or made in view of the water treatment and distribution systems as a whole. For example, better prediction and anticipation of downstream contamination events may be made by having multiple data points obtained from sites or locations throughout a collection or distribution system associated with the water treatment system, thus allowing appropriate actions to be taken downstream to lessen or prevent the impact or damage caused by the contamination event, such as the introduction of dangerous, poisonous or unhealthful contaminants into the environment or drinking water.

For example, the water treatment core facility may be a central WWTP that receives waste released from multiple sources upstream that converge into a common collection system that feeds into the central WWTP. The collection system may serve numerous wastewater treatment sites or industrial waste sites that feed into a central WWTP. According to some embodiments of the present invention, multiple sensors may be placed throughout a collection system, including the water treatment and industrial waste sites, to monitor discharge into the common collection system. Water treatment sites may include cities, manufacturers, agricultural operations, etc., which treat wastewater before it is discharged into the common collection system. For a WWTP operator, an accurate prediction of the composition of incoming wastewater would be highly beneficial for the efficient operation of the WWTP facility.

According to some embodiments of the present invention, the composition of influx water in a WWTP serving a geographically distributed wastewater collection system may be estimated from measurements taken from sensors located upstream, such as at or near wastewater treatment sites or industrial waste sites discharging into the common collection system. Since the water flow patterns, water transit times and the composition of water leaving each of the treatment or industrial sites within the wastewater collection system may be known, the expected composition of influx water arriving at the WWTP can be calculated and reliably and quickly transmitted to the operators of the central WWTP and/or remotely to other entities or persons, such as through a remote viewing device. In addition to known information, the volumetric flow rate may be measured using the one or more sensors. This advance notice allows the WWTP to respond to varying contaminant or pollutant introductions in a far more effective manner than at present, where the first knowledge or information may come after the contaminants have already entered or even passed through the system. For WWTP entities that operate reclamation facilities downstream of the WWTP, this advance knowledge is even more valuable, because it allows the reclamation facility to modify its operations as necessary to prevent damage to the process facilities. It will be readily appreciated by WWTP operators that knowledge of the incoming wastewater composition would be of great benefit in assuring the continued operation of the central facility at top efficiency.

One advantage of some embodiments of the present invention is that the remote water quality monitoring system of the present invention may create a layer of redundancy that may be independent of and/or complementary to the direct monitoring carried out by qualified individuals at a water treatment system or facility to safeguard operation of the water treatment system. Redundancy may also be achieved by, perhaps simultaneously, reporting analyzed or manipulated data to multiple persons and/or entities in the same or different format. In addition, the remote water quality monitoring system may reduce or eliminate the need for direct human involvement. By having the remote water quality monitoring system automatically perform the calculations and manipulations on the raw data in real-time without direct human involvement, there may be less human error in evaluating, analyzing, etc., water quality and the operation of the water treatment system.

Another possible advantage of some embodiments of the present invention is that the data may be transmitted to a server where more advanced computations, manipulations, analysis, etc., may be performed prior to reporting, uploading, etc., an output, such as an analysis result, analysis report or alarm, to a user. A software program on the server may be more sophisticated than may be achieved locally, such as with the local electronic control systems used to control and operate the water treatment system, plant or facility. This may allow for the processing power of existing control systems to not be impaired or impacted. For example, an analysis report generated by manipulation of the data on a server may include a submission to a regulatory agency to meet reporting requirements in the format required by the agency, and such reporting may be performed automatically. The remote analysis, manipulation, etc., may be performed quickly and automatically to remotely monitor operation and water conditions in real-time, continuously, at selected, periodic or regular intervals, on condition or upon demand of a user and rapidly generate multiple types of outputs, such as alarms, analysis results, analysis reports, etc., to one or more users. For example, the software program may separately generate a detailed regulatory report for submission to a regulatory agency, send a simple alarm to authorized personnel to alert of a contamination or equipment failure, and/or post data and information about the water treatment system on a web page for access by members of the public. Alternatively, the analysis, manipulation, etc., of data and information may be performed locally on the environmental instrument, such as a logger. According to some embodiments of the present invention, such analysis, manipulation, etc., of data and information on the environmental instrument may be performed in addition to further analysis, manipulation, etc., of data on the server.

Yet another advantage of some embodiments of the present invention is that greater flexibility and accessibility may be achieved over existing systems by allowing a user access to the server to receive data, information, reports, etc., sent by any known means or wireless mode of communication from the server. By having greater accessibility and communication of data, information, reports, etc., greater coordination may be achieved between different parts of the water treatment system and any associated collection or distribution system, which may include, for example, remote sites or locations of industrial waste discharge in the case of a WWTP.

Yet another advantage of some embodiments of the present invention is that the remote water quality monitoring system may be implemented with moderate cost, because the remote water quality monitoring system may be incorporated or interfaced with existing sensors and/or an electronic control system of a water treatment system without modification of the design or layout of the water treatment system. Furthermore, the data collected from the water treatment system may be transmitted electronically to the server using, for example, existing communication networks.

Another advantage of some embodiments of the present invention is that the cause, scope or location of a problem or source of contamination may be better determined, tracked or distinguished by having more independent data points of reference obtained from sensors at sites or locations throughout a water treatment system, such as sites or locations in a water treatment core facility as well as throughout a collection or distribution system, i.e., in the field. Such analysis or determinations may be aided by the existence of historical data and known information about the operation of the water treatment system in relation to its environment which may be used for comparison. For example, a chemically or biologically active agent may be deliberately injected into the distribution system at a point downstream of a potable drinking water treatment facility. A sophisticated terrorist might first inject a chlorine scavenger, such as sodium metabisulfite, into the distribution system to eliminate the residual chlorine normally present. At some point downstream of the metabisulfite injection point, the chemical or biological agent could be injected into the water without destruction by any residual disinfectant. Without a remote water quality monitoring system in place with sensors in the distribution system, such contamination could go undetected for quite some time, allowing a thorough infiltration of a biological or chemical agent throughout the distribution system. By contrast, the remote water quality monitoring system could detect that the residual chlorine at the sensor had diminished to zero and sound the alarm. Especially with historical data available for comparison, the remote water quality monitoring system would be able to reduce the incidence of false terrorist attack alarms because data obtained from sensors at the treatment facility and in the distribution system could be compared. For example, a chlorine-dosing equipment failure might be determined and distinguished from a terrorist attack if a decrease in chlorine concentration is observed at both the water treatment plant and at points in the distribution system.

In the claims, unless specified otherwise, steps of a method may be performed in any order. For example, in a method claim, step (b) may be performed before step (a), unless the language of the claim requires that step (a) be performed prior to step (b).

Having described many embodiments of the present invention, it will be apparent that modifications, variations, alterations and changes are possible without departing from the full scope of the invention as defined in the appended claims, and equivalents thereof. It should be appreciated that all examples in the present disclosure, while illustrating many embodiments of the invention, are provided as non-limiting examples and are, therefore, not to be taken as limiting the various aspects so illustrated.

What is claimed is:

1. An apparatus comprising:
   one or more environmental instruments for monitoring water quality for one or more water streams,
   a communication server comprising a server monitor that remotely programs the one or more environmental instruments and sends a task instruction to the one or more environmental instruments based on data reported by the one or more environmental instruments,
   an alarm transmission server in communication with the communication server, and
   a server database,
   wherein the communication server is in communication with the one or more environmental instruments,
   wherein each of the one or more environmental instruments connects to the communication server to report on tasks run by the environmental instrument based on a primary interval for the environmental instrument,
   wherein the server monitor continuously queries the server database for tasks that are scheduled to be run by each of the one or more environmental instruments based on a task schedule and a current time on the communication server,
   wherein the task schedule is based on the primary intervals for each of the one or more environmental instruments, and
   wherein an alarm transmission server of the one or more servers sends an alarm to one or more output devices if the server monitor determines that a selected environmental instrument of the one or more environmental instruments is malfunctioning based on the selected environmental instrument failing to connect to the communication server for one or more primary intervals for the environmental instrument.

2. The apparatus of claim 1, wherein each of the environmental instruments has an alarm trigger value that specifies the number of consecutive times that a respective environmental instrument must fail to connect to the communication server before a missed call alarm is set for the environmental instrument and sent to the one or more output devices.

3. The apparatus of claim 1, wherein the one or more output devices comprise one or more visual display devices.

4. The apparatus of claim 3, wherein the transmission server is in communication with the one or more visual display devices via a web browser.

5. The apparatus of claim 1, wherein the environmental instrument is a logger.

6. The apparatus of claim 1, wherein the environmental instrument is a sampler.

7. The apparatus of claim 1, wherein the one or more environmental instruments are in wireless communication with the communication server.

8. The apparatus of claim 7, wherein the one or more environmental instruments are in wireless communication with the communication server via the Internet.

9. The apparatus of claim 1, wherein when each of the one or more environmental instruments connects to the communication server to report results of a task performed by the environmental instrument, the communication server saves the results of the task and the current time on the communication server to the server database.

10. A method comprising the following steps:
    (a) a server monitor of a communication server continuously querying a server database for tasks that are scheduled to be run by each of one or more environmental instruments based on a task schedule and a current time, the server monitor remotely programming the one or more environmental instruments and sending a task instruction to the one or more environmental instruments based on data reported by the one or more environmental instruments,
    (b) an alarm transmission server for sending an alarm to one or more output devices if the server monitor determines that a selected environmental instrument of the one or more environmental instruments is malfunctioning based on the selected environmental instrument failing to connect to the communication server for one or more primary intervals for the environmental instrument,
    wherein the alarm transmission server is in communication with the communication server,
    wherein the one or more environmental instruments monitor water quality for one or more water streams, and
    wherein the task schedule is based on the primary intervals for each of the one or more environmental instruments.

11. The method of claim 10, wherein each of the environmental instruments has an alarm trigger value that specifies the number of consecutive times that a respective environmental instrument must fail to connect to the communication server before a missed call alarm is set for the environmental instrument and sent to the one or more output devices.

12. The method of claim 10, wherein the one or more output devices comprise one or more visual display devices.

13. The method of claim 12, wherein transmission server is in communication with the one or more visual display devices via a web browser.

14. The method of claim 10, wherein the environmental instrument is a logger.

15. The method of claim 10, wherein the environmental instrument is a sampler.

16. The method of claim 10, wherein the one or more environmental instruments are in wireless communication with the communication server.

17. The method of claim 16, wherein the one or more environmental instruments are in wireless communication with the communication server via the Internet.

18. The method of claim 10, comprising the following step:
    (c) when each of the one or more environmental instruments connects to the communication server to report results of a task performed by the environmental instrument, the communication server saves the results of the task and the current time on the communication server to the server database.

* * * * *